United States Patent
Baker et al.

(10) Patent No.: US 8,983,301 B2
(45) Date of Patent: Mar. 17, 2015

(54) LOCALIZATION SERVICES IN OPTICAL FIBER-BASED DISTRIBUTED COMMUNICATIONS COMPONENTS AND SYSTEMS, AND RELATED METHODS

(71) Applicant: Corning Optical Communications LLC, Hickory, NC (US)

(72) Inventors: Kenneth Robert Baker, Lyons, CO (US); Michael Sauer, Corning, NY (US)

(73) Assignee: Corning Optical Communications LLC, Hickory, NC (US)

( * ) Notice: Subject to any disclaimer, the term of this patent is extended or adjusted under 35 U.S.C. 154(b) by 92 days.

(21) Appl. No.: 13/628,497

(22) Filed: Sep. 27, 2012

(65) Prior Publication Data

US 2013/0028606 A1  Jan. 31, 2013

Related U.S. Application Data

(63) Continuation of application No. PCT/US2011/029895, filed on Mar. 25, 2011.

(60) Provisional application No. 61/319,659, filed on Mar. 31, 2010.

(51) Int. Cl.
*H04B 10/00* (2013.01)
*G01S 5/02* (2010.01)
(Continued)

(52) U.S. Cl.
CPC ........ *G01S 5/0226* (2013.01); *H04B 10/25754* (2013.01); *H04W 4/18* (2013.01); *H04W 64/00* (2013.01); *H04W 88/00* (2013.01)
USPC .......................................... 398/116; 398/115

(58) Field of Classification Search
CPC ............... H04B 10/2575; H04B 10/25752; H04B 10/25753; H04W 76/007; H04W 4/025
USPC ............ 398/115–117; 455/403, 404.1, 404.2, 455/422.1, 456.1
See application file for complete search history.

(56) References Cited

U.S. PATENT DOCUMENTS

| 4,449,246 A | 5/1984 | Seiler et al. |
| 4,573,212 A | 2/1986 | Lipsky |

(Continued)

FOREIGN PATENT DOCUMENTS

| CN | 1222007 A | 7/1999 |
| CN | 1242911 A | 1/2000 |

(Continued)

OTHER PUBLICATIONS

Author Unknown, "CDMA Co-Pilot Transmitter," Product Specifications, Cellular Specialties, Inc., 021-0000-001 MKTG REV 2, Aug. 2009, www.cellularspecialties.com, 2 pages.

(Continued)

*Primary Examiner* — David Payne
*Assistant Examiner* — Casey Kretzer
(74) *Attorney, Agent, or Firm* — C. Keith Montgomery

(57) ABSTRACT

Optical fiber-based distributed communications components and systems, and related methods to provide localization services for client devices are disclosed. The localization services allow the providing and/or determination of the location of client devices in communication with a component or components of the optical fiber-based distributed communications system. The location of client devices can be provided and/or determined based on knowledge of the location of the component or components in the optical fiber-based distributed communications system in communication with the client device. This information can be used to determine or provide a more precise area of location or area of location for client devices. The optical fiber-based distributed communications components and systems, and related methods disclosed herein may be well-suited for indoor environments where other methods of providing and/or determining location of client devices may be obstructed or not possible due to the indoor environment.

20 Claims, 12 Drawing Sheets

(51) Int. Cl.
*H04B 10/2575* (2013.01)
*H04W 4/18* (2009.01)
*H04W 64/00* (2009.01)
*H04W 88/00* (2009.01)

(56) References Cited

U.S. PATENT DOCUMENTS

| | | | |
|---|---|---|---|
| 4,665,560 A | 5/1987 | Lange | |
| 4,939,852 A | 7/1990 | Brenner | |
| 4,972,346 A | 11/1990 | Kawano et al. | |
| 5,056,109 A | 10/1991 | Gilhousen et al. | |
| 5,059,927 A | 10/1991 | Cohen | |
| 5,187,803 A | 2/1993 | Sohner et al. | |
| 5,206,655 A | 4/1993 | Caille et al. | |
| 5,208,812 A | 5/1993 | Dudek et al. | |
| 5,278,989 A | 1/1994 | Burke et al. | |
| 5,280,472 A | 1/1994 | Gilhousen et al. | |
| 5,381,459 A | 1/1995 | Lappington | |
| 5,396,224 A | 3/1995 | Dukes et al. | |
| 5,420,863 A | 5/1995 | Taketsugu et al. | |
| 5,519,830 A | 5/1996 | Opoczynski | |
| 5,602,903 A | 2/1997 | LeBlanc et al. | 379/60 |
| 5,606,725 A | 2/1997 | Hart | |
| 5,668,562 A | 9/1997 | Cutrer et al. | |
| 5,708,681 A | 1/1998 | Malkemes et al. | |
| 5,726,984 A | 3/1998 | Kubler et al. | |
| 5,765,099 A | 6/1998 | Georges et al. | |
| 5,790,536 A | 8/1998 | Mahany et al. | |
| 5,802,173 A | 9/1998 | Hamilton-Piercy et al. | |
| 5,809,395 A | 9/1998 | Hamilton-Piercy et al. | |
| 5,809,431 A | 9/1998 | Bustamante et al. | |
| 5,818,883 A | 10/1998 | Smith et al. | |
| 5,839,052 A | 11/1998 | Dean et al. | |
| 5,862,460 A | 1/1999 | Rich | |
| 5,867,763 A | 2/1999 | Dean et al. | |
| 5,873,040 A | 2/1999 | Dunn et al. | 455/456 |
| 5,953,670 A | 9/1999 | Newson et al. | |
| 5,969,837 A * | 10/1999 | Farber et al. | 379/56.2 |
| 5,983,070 A | 11/1999 | Georges et al. | |
| 6,006,069 A | 12/1999 | Langston | |
| 6,011,980 A | 1/2000 | Nagano et al. | |
| 6,014,546 A | 1/2000 | Georges et al. | |
| 6,037,898 A | 3/2000 | Parish et al. | |
| 6,046,838 A * | 4/2000 | Kou et al. | 359/245 |
| 6,069,721 A | 5/2000 | Oh et al. | |
| 6,118,767 A | 9/2000 | Shen et al. | |
| 6,122,529 A | 9/2000 | Sabat, Jr. et al. | |
| 6,128,470 A | 10/2000 | Naidu et al. | |
| 6,128,477 A | 10/2000 | Freed | |
| 6,157,810 A | 12/2000 | Georges et al. | |
| 6,178,334 B1 | 1/2001 | Shyy et al. | |
| 6,192,216 B1 | 2/2001 | Sabat, Jr. et al. | |
| 6,194,968 B1 | 2/2001 | Winslow | |
| 6,212,397 B1 | 4/2001 | Langston et al. | |
| 6,222,503 B1 | 4/2001 | Gietema et al. | |
| 6,223,201 B1 | 4/2001 | Reznak | |
| 6,236,365 B1 | 5/2001 | LeBlanc et al. | 342/457 |
| 6,236,863 B1 | 5/2001 | Waldroup et al. | |
| 6,249,252 B1 | 6/2001 | Dupray | 342/450 |
| 6,275,990 B1 | 8/2001 | Dapper et al. | |
| 6,279,158 B1 | 8/2001 | Geile et al. | |
| 6,286,163 B1 | 9/2001 | Trimble | |
| 6,295,451 B1 | 9/2001 | Mimura | |
| 6,307,869 B1 | 10/2001 | Pawelski | |
| 6,317,599 B1 | 11/2001 | Rappaport et al. | |
| 6,330,241 B1 | 12/2001 | Fort | |
| 6,330,244 B1 | 12/2001 | Swartz et al. | |
| 6,334,219 B1 | 12/2001 | Hill et al. | |
| 6,336,021 B1 | 1/2002 | Nukada | |
| 6,336,042 B1 | 1/2002 | Dawson et al. | |
| 6,340,932 B1 | 1/2002 | Rodgers et al. | |
| 6,370,203 B1 | 4/2002 | Boesch et al. | |
| 6,374,124 B1 | 4/2002 | Slabinski | |
| 6,389,010 B1 | 5/2002 | Kubler et al. | |
| 6,400,318 B1 | 6/2002 | Kasami et al. | |
| 6,400,418 B1 | 6/2002 | Wakabayashi | |
| 6,404,775 B1 | 6/2002 | Leslie et al. | |
| 6,414,624 B2 | 7/2002 | Endo et al. | |
| 6,415,132 B1 | 7/2002 | Sabat, Jr. | |
| 6,421,327 B1 | 7/2002 | Lundby et al. | |
| 6,448,558 B1 | 9/2002 | Greene | |
| 6,452,915 B1 | 9/2002 | Jorgensen | |
| 6,480,702 B1 | 11/2002 | Sabat, Jr. | |
| 6,519,449 B1 | 2/2003 | Zhang et al. | |
| 6,535,330 B1 | 3/2003 | Lelic et al. | |
| 6,535,720 B1 | 3/2003 | Kintis et al. | |
| 6,580,402 B2 | 6/2003 | Navarro et al. | |
| 6,580,905 B1 | 6/2003 | Naidu et al. | |
| 6,587,514 B1 | 7/2003 | Wright et al. | |
| 6,598,009 B2 | 7/2003 | Yang | |
| 6,615,074 B2 | 9/2003 | Mickle et al. | |
| 6,628,732 B1 | 9/2003 | Takaki | |
| 6,657,535 B1 | 12/2003 | Magbie et al. | |
| 6,658,269 B1 | 12/2003 | Golemon et al. | |
| 6,665,308 B1 | 12/2003 | Rakib et al. | |
| 6,670,930 B2 | 12/2003 | Navarro | |
| 6,678,509 B2 | 1/2004 | Skarman et al. | |
| 6,704,298 B1 | 3/2004 | Matsumiya et al. | |
| 6,714,800 B2 | 3/2004 | Johnson et al. | |
| 6,745,013 B1 | 6/2004 | Porter et al. | |
| 6,763,226 B1 | 7/2004 | McZeal, Jr. | |
| 6,785,558 B1 | 8/2004 | Stratford et al. | |
| 6,801,767 B1 | 10/2004 | Schwartz et al. | |
| 6,823,174 B1 | 11/2004 | Masenten et al. | |
| 6,826,163 B2 | 11/2004 | Mani et al. | |
| 6,836,660 B1 | 12/2004 | Wala | |
| 6,836,673 B1 | 12/2004 | Trott | |
| 6,842,433 B2 | 1/2005 | West et al. | |
| 6,850,510 B2 | 2/2005 | Kubler et al. | |
| 6,876,056 B2 | 4/2005 | Tilmans et al. | |
| 6,876,945 B2 | 4/2005 | Emord | 702/150 |
| 6,882,311 B2 | 4/2005 | Walker et al. | |
| 6,885,344 B2 | 4/2005 | Mohamadi | |
| 6,909,399 B1 | 6/2005 | Zegelin et al. | 342/463 |
| 6,915,529 B1 | 7/2005 | Suematsu et al. | |
| 6,919,858 B2 | 7/2005 | Rofougaran | |
| 6,931,659 B1 | 8/2005 | Kinemura | |
| 6,934,511 B1 | 8/2005 | Lovinggood et al. | |
| 6,934,541 B2 | 8/2005 | Miyatani | |
| 6,941,112 B2 | 9/2005 | Hasegawa | |
| 6,946,989 B2 | 9/2005 | Vavik | |
| 6,952,181 B2 | 10/2005 | Karr et al. | 342/457 |
| 6,961,312 B2 | 11/2005 | Kubler et al. | |
| 6,967,347 B2 | 11/2005 | Estes et al. | |
| 6,977,502 B1 | 12/2005 | Hertz | |
| 7,002,511 B1 | 2/2006 | Ammar et al. | |
| 7,015,826 B1 | 3/2006 | Chan et al. | |
| 7,020,488 B1 | 3/2006 | Bleile et al. | |
| 7,024,166 B2 | 4/2006 | Wallace | |
| 7,039,399 B2 | 5/2006 | Fischer | |
| 7,043,271 B1 | 5/2006 | Seto et al. | |
| 7,050,017 B2 | 5/2006 | King et al. | |
| 7,053,838 B2 | 5/2006 | Judd | |
| 7,069,577 B2 | 6/2006 | Geile et al. | |
| 7,103,119 B2 | 9/2006 | Matsuoka et al. | |
| 7,103,377 B2 | 9/2006 | Bauman et al. | |
| 7,110,795 B2 | 9/2006 | Doi | |
| 7,142,535 B2 | 11/2006 | Kubler et al. | |
| 7,142,619 B2 | 11/2006 | Sommer et al. | |
| 7,171,244 B2 | 1/2007 | Bauman | |
| 7,184,728 B2 | 2/2007 | Solum | |
| 7,190,748 B2 | 3/2007 | Kim et al. | |
| 7,194,023 B2 | 3/2007 | Norrell et al. | |
| 7,194,275 B2 | 3/2007 | Bolin et al. | 455/456.6 |
| 7,199,443 B2 | 4/2007 | Elsharawy | |
| 7,280,011 B2 | 10/2007 | Bayar et al. | |
| 7,298,327 B2 | 11/2007 | Dupray et al. | 342/451 |
| 7,315,735 B2 | 1/2008 | Graham | 455/404.1 |
| 7,336,961 B1 | 2/2008 | Ngan | 455/456.1 |
| 7,348,843 B1 | 3/2008 | Qiu et al. | |
| 7,359,674 B2 | 4/2008 | Markki et al. | |
| 7,359,718 B2 | 4/2008 | Tao et al. | |
| 7,366,151 B2 | 4/2008 | Kubler et al. | |
| 7,369,526 B2 | 5/2008 | Lechleider et al. | |

(56) References Cited

U.S. PATENT DOCUMENTS

| | | | |
|---|---|---|---|
| 7,392,025 B2 | 6/2008 | Rooyen et al. | |
| 7,395,181 B2 | 7/2008 | Foxlin | 702/155 |
| 7,412,224 B2 | 8/2008 | Kotola et al. | |
| 7,450,853 B2 | 11/2008 | Kim et al. | |
| 7,451,365 B2 | 11/2008 | Wang et al. | |
| 7,454,222 B2 | 11/2008 | Huang et al. | |
| 7,460,507 B2 | 12/2008 | Kubler et al. | |
| 7,471,243 B2 | 12/2008 | Roslak | |
| 7,483,711 B2 | 1/2009 | Burchfiel | |
| 7,505,747 B2 | 3/2009 | Solum | |
| 7,512,419 B2 | 3/2009 | Solum | |
| 7,525,484 B2 | 4/2009 | Dupray et al. | 342/450 |
| 7,539,509 B2 | 5/2009 | Bauman et al. | |
| 7,542,452 B2 | 6/2009 | Penumetsa | |
| 7,546,138 B2 | 6/2009 | Bauman | |
| 7,548,138 B2 | 6/2009 | Kamgaing | |
| 7,551,641 B2 | 6/2009 | Pirzada et al. | |
| 7,557,758 B2 | 7/2009 | Rofougaran | |
| 7,580,384 B2 | 8/2009 | Kubler et al. | |
| 7,586,861 B2 | 9/2009 | Kubler et al. | |
| 7,593,704 B2 | 9/2009 | Pinel et al. | |
| 7,599,420 B2 | 10/2009 | Forenza et al. | |
| 7,599,672 B2 | 10/2009 | Shoji et al. | |
| 7,610,046 B2 | 10/2009 | Wala | |
| 7,630,690 B2 | 12/2009 | Kaewell, Jr. et al. | |
| 7,633,934 B2 | 12/2009 | Kubler et al. | |
| 7,639,982 B2 | 12/2009 | Wala | |
| 7,646,743 B2 | 1/2010 | Kubler et al. | |
| 7,646,777 B2 | 1/2010 | Hicks, III et al. | |
| 7,653,397 B2 | 1/2010 | Pernu et al. | |
| 7,668,565 B2 | 2/2010 | Ylänen et al. | |
| 7,688,811 B2 | 3/2010 | Kubler et al. | |
| 7,693,486 B2 | 4/2010 | Kasslin et al. | |
| 7,697,467 B2 | 4/2010 | Kubler et al. | |
| 7,697,574 B2 | 4/2010 | Suematsu et al. | |
| 7,714,778 B2 | 5/2010 | Dupray | 342/357.01 |
| 7,715,375 B2 | 5/2010 | Kubler et al. | |
| 7,751,374 B2 | 7/2010 | Donovan | |
| 7,751,838 B2 | 7/2010 | Ramesh et al. | |
| 7,760,703 B2 | 7/2010 | Kubler et al. | |
| 7,764,231 B1 | 7/2010 | Karr et al. | 342/457 |
| 7,768,951 B2 | 8/2010 | Kubler et al. | |
| 7,773,573 B2 | 8/2010 | Chung et al. | |
| 7,778,603 B2 | 8/2010 | Palin et al. | |
| 7,787,823 B2 | 8/2010 | George et al. | |
| 7,787,887 B2 | 8/2010 | Gupta et al. | |
| 7,809,012 B2 | 10/2010 | Ruuska et al. | |
| 7,812,766 B2 | 10/2010 | Leblanc et al. | |
| 7,812,775 B2 | 10/2010 | Babakhani et al. | |
| 7,817,969 B2 | 10/2010 | Castaneda et al. | |
| 7,835,328 B2 | 11/2010 | Stephens et al. | |
| 7,848,316 B2 | 12/2010 | Kubler et al. | |
| 7,848,770 B2 | 12/2010 | Scheinert | |
| 7,853,234 B2 | 12/2010 | Afsahi | |
| 7,860,518 B2 | 12/2010 | Flanagan et al. | 455/456.1 |
| 7,870,321 B2 | 1/2011 | Rofougaran | |
| 7,880,677 B2 | 2/2011 | Rofougaran et al. | |
| 7,881,755 B1 | 2/2011 | Mishra et al. | |
| 7,894,423 B2 | 2/2011 | Kubler et al. | |
| 7,899,007 B2 | 3/2011 | Kubler et al. | |
| 7,903,029 B2 | 3/2011 | Dupray | 342/457 |
| 7,907,972 B2 | 3/2011 | Walton et al. | |
| 7,912,043 B2 | 3/2011 | Kubler et al. | |
| 7,912,506 B2 | 3/2011 | Lovberg et al. | |
| 7,916,706 B2 | 3/2011 | Kubler et al. | |
| 7,917,177 B2 | 3/2011 | Bauman | |
| 7,920,553 B2 | 4/2011 | Kubler et al. | |
| 7,920,858 B2 | 4/2011 | Sabat, Jr. et al. | |
| 7,924,783 B1 | 4/2011 | Mahany et al. | |
| 7,936,713 B2 | 5/2011 | Kubler et al. | |
| 7,949,364 B2 | 5/2011 | Kasslin et al. | |
| 7,957,777 B1 | 6/2011 | Vu et al. | |
| 7,962,111 B2 | 6/2011 | Solum | |
| 7,969,009 B2 | 6/2011 | Chandrasekaran | |
| 7,969,911 B2 | 6/2011 | Mahany et al. | |
| 7,990,925 B2 | 8/2011 | Tinnakornsrisuphap et al. | |
| 7,996,020 B1 | 8/2011 | Chhabra | |
| 8,005,050 B2 | 8/2011 | Scheinert et al. | 370/335 |
| 8,018,907 B2 | 9/2011 | Kubler et al. | |
| 8,023,886 B2 | 9/2011 | Rofougaran | |
| 8,027,656 B2 | 9/2011 | Rofougaran et al. | |
| 8,032,153 B2 | 10/2011 | Dupray et al. | 455/456.1 |
| 8,036,308 B2 | 10/2011 | Rofougaran | |
| 8,072,381 B1 | 12/2011 | Ziegler | 342/386 |
| 8,081,923 B1 | 12/2011 | Larsen et al. | 455/18 |
| 8,082,096 B2 | 12/2011 | Dupray | 701/207 |
| 8,082,353 B2 | 12/2011 | Huber et al. | |
| 8,086,192 B2 | 12/2011 | Rofougaran et al. | |
| 8,111,998 B2 | 2/2012 | George et al. | |
| 8,135,413 B2 | 3/2012 | Dupray | 455/456.1 |
| 8,442,556 B2 | 5/2013 | Rawat et al. | |
| 8,604,909 B1* | 12/2013 | Amir et al. | 340/8.1 |
| 2001/0036199 A1 | 11/2001 | Terry | |
| 2002/0051434 A1 | 5/2002 | Ozluturk et al. | |
| 2002/0123365 A1 | 9/2002 | Thorson et al. | |
| 2002/0128009 A1 | 9/2002 | Boch et al. | |
| 2003/0146871 A1 | 8/2003 | Karr et al. | 342/457 |
| 2003/0157943 A1 | 8/2003 | Sabat, Jr. | 455/456 |
| 2004/0022215 A1 | 2/2004 | Okuhata et al. | |
| 2004/0095907 A1 | 5/2004 | Agee et al. | |
| 2004/0102196 A1 | 5/2004 | Weckstrom et al. | 454/456.1 |
| 2004/0131025 A1 | 7/2004 | Dohler et al. | |
| 2004/0139477 A1 | 7/2004 | Russell et al. | |
| 2004/0146020 A1 | 7/2004 | Kubler et al. | |
| 2004/0151164 A1 | 8/2004 | Kubler et al. | |
| 2004/0160912 A1 | 8/2004 | Kubler et al. | |
| 2004/0160913 A1 | 8/2004 | Kubler et al. | |
| 2004/0162084 A1* | 8/2004 | Wang | 455/456.1 |
| 2004/0165573 A1 | 8/2004 | Kubler et al. | |
| 2004/0196404 A1 | 10/2004 | Loheit et al. | |
| 2004/0198386 A1 | 10/2004 | Dupray | 455/456.1 |
| 2004/0235497 A1* | 11/2004 | Zekavat | 455/456.1 |
| 2004/0246926 A1 | 12/2004 | Belcea et al. | |
| 2005/0020309 A1 | 1/2005 | Moeglein et al. | 455/456.1 |
| 2005/0143091 A1 | 6/2005 | Shapira et al. | 455/456.1 |
| 2005/0147071 A1 | 7/2005 | Karaoguz et al. | |
| 2005/0153712 A1 | 7/2005 | Osaka et al. | 455/456.5 |
| 2005/0272439 A1 | 12/2005 | Picciriello et al. | |
| 2006/0014548 A1 | 1/2006 | Bolin et al. | 455/456.1 |
| 2006/0025158 A1 | 2/2006 | Leblanc et al. | 455/456.2 |
| 2006/0056327 A1 | 3/2006 | Coersmeier | |
| 2006/0209752 A1 | 9/2006 | Wijngaarden et al. | 370/328 |
| 2006/0223439 A1 | 10/2006 | Pinel et al. | |
| 2006/0274704 A1 | 12/2006 | Desai et al. | |
| 2006/0276202 A1 | 12/2006 | Moeglein et al. | 455/456.1 |
| 2007/0054682 A1 | 3/2007 | Fanning et al. | |
| 2007/0060045 A1 | 3/2007 | Prautzsch | |
| 2007/0060055 A1 | 3/2007 | Desai et al. | |
| 2007/0076649 A1 | 4/2007 | Lin et al. | |
| 2007/0093273 A1 | 4/2007 | Cai | |
| 2007/0104128 A1 | 5/2007 | Laroia et al. | 370/329 |
| 2007/0104164 A1 | 5/2007 | Laroia et al. | 370/338 |
| 2007/0140168 A1 | 6/2007 | Laroia et al. | 370/330 |
| 2007/0224954 A1 | 9/2007 | Gopi | |
| 2007/0253355 A1 | 11/2007 | Hande et al. | 371/328 |
| 2007/0268846 A1 | 11/2007 | Proctor, Jr. et al. | |
| 2007/0268853 A1 | 11/2007 | Ma et al. | 370/328 |
| 2007/0292143 A1 | 12/2007 | Yu et al. | |
| 2007/0297005 A1 | 12/2007 | Montierth et al. | |
| 2008/0002652 A1 | 1/2008 | Gupta et al. | |
| 2008/0043714 A1 | 2/2008 | Pernu | |
| 2008/0063397 A1 | 3/2008 | Hu et al. | |
| 2008/0077326 A1 | 3/2008 | Funk et al. | 701/220 |
| 2008/0098203 A1 | 4/2008 | Master et al. | |
| 2008/0118014 A1 | 5/2008 | Reunamaki et al. | |
| 2008/0119208 A1 | 5/2008 | Flanagan et al. | 455/456.6 |
| 2008/0129634 A1 | 6/2008 | Pera et al. | |
| 2008/0134194 A1 | 6/2008 | Liu | |
| 2008/0167049 A1 | 7/2008 | Karr et al. | 455/456.2 |
| 2008/0194226 A1 | 8/2008 | Rivas et al. | 455/404.2 |
| 2008/0207253 A1 | 8/2008 | Jaakkola et al. | |
| 2008/0232328 A1* | 9/2008 | Scheinert et al. | 370/335 |
| 2008/0253351 A1 | 10/2008 | Pernu et al. | |
| 2008/0261656 A1 | 10/2008 | Bella et al. | |

(56) References Cited

U.S. PATENT DOCUMENTS

| | | |
|---|---|---|
| 2008/0268833 A1 | 10/2008 | Huang et al. |
| 2008/0279137 A1 | 11/2008 | Pernu et al. |
| 2008/0280569 A1 | 11/2008 | Hazani et al. |
| 2008/0291830 A1 | 11/2008 | Pernu et al. |
| 2008/0292322 A1 | 11/2008 | Daghighian et al. |
| 2008/0310341 A1 | 12/2008 | Koyanagi |
| 2008/0310464 A1 | 12/2008 | Schneider |
| 2008/0311876 A1 | 12/2008 | Leenaerts et al. |
| 2009/0022304 A1 | 1/2009 | Kubler et al. |
| 2009/0028087 A1 | 1/2009 | Nguyen et al. |
| 2009/0028317 A1 | 1/2009 | Ling et al. |
| 2009/0059903 A1 | 3/2009 | Kubler et al. |
| 2009/0061796 A1 | 3/2009 | Arkko et al. |
| 2009/0073054 A1 | 3/2009 | Yoon et al. |
| 2009/0073916 A1 | 3/2009 | Zhang et al. |
| 2009/0088071 A1 | 4/2009 | Rofougaran |
| 2009/0141780 A1 | 6/2009 | Cruz-Albrecht et al. |
| 2009/0149221 A1 | 6/2009 | Liu et al. |
| 2009/0163224 A1 | 6/2009 | Dean et al. ............... 455/456.1 |
| 2009/0175214 A1 | 7/2009 | Sfar et al. |
| 2009/0176507 A1 | 7/2009 | Wu et al. ............... 455/456.2 |
| 2009/0191891 A1 | 7/2009 | Ma et al. ............... 455/456.1 |
| 2009/0218407 A1 | 9/2009 | Rofougaran |
| 2009/0218657 A1 | 9/2009 | Rofougaran |
| 2009/0237317 A1 | 9/2009 | Rofougaran |
| 2009/0245084 A1 | 10/2009 | Moffatt et al. |
| 2009/0245153 A1 | 10/2009 | Li et al. |
| 2009/0245221 A1 | 10/2009 | Piipponen |
| 2009/0247109 A1 | 10/2009 | Rofougaran |
| 2009/0252136 A1 | 10/2009 | Mahany et al. |
| 2009/0252205 A1 | 10/2009 | Rheinfelder et al. |
| 2009/0258652 A1 | 10/2009 | Lambert et al. |
| 2009/0278596 A1 | 11/2009 | Rofougaran et al. |
| 2009/0279593 A1 | 11/2009 | Rofougaran et al. |
| 2009/0285147 A1 | 11/2009 | Subasic et al. |
| 2010/0002626 A1 | 1/2010 | Schmidt et al. |
| 2010/0007485 A1 | 1/2010 | Kodrin et al. ............... 340/539.13 |
| 2010/0027443 A1 | 2/2010 | LoGalbo et al. |
| 2010/0056200 A1 | 3/2010 | Tolonen |
| 2010/0061291 A1 | 3/2010 | Wala |
| 2010/0080154 A1 | 4/2010 | Noh et al. |
| 2010/0080182 A1 | 4/2010 | Kubler et al. |
| 2010/0091475 A1 | 4/2010 | Toms et al. |
| 2010/0118864 A1 | 5/2010 | Kubler et al. |
| 2010/0127937 A1 | 5/2010 | Chandrasekaran et al. |
| 2010/0128568 A1 | 5/2010 | Han et al. ............... 367/99 |
| 2010/0134257 A1 | 6/2010 | Puleston et al. |
| 2010/0142598 A1 | 6/2010 | Murray et al. |
| 2010/0142955 A1 | 6/2010 | Yu et al. |
| 2010/0144285 A1 | 6/2010 | Behzad et al. |
| 2010/0148373 A1 | 6/2010 | Chandrasekaran |
| 2010/0156721 A1 | 6/2010 | Alamouti et al. |
| 2010/0159859 A1 | 6/2010 | Rofougaran |
| 2010/0178936 A1 | 7/2010 | Wala et al. ............... 455/456.2 |
| 2010/0188998 A1 | 7/2010 | Pernu et al. |
| 2010/0190509 A1 | 7/2010 | Davis |
| 2010/0202326 A1 | 8/2010 | Rofougaran et al. |
| 2010/0225413 A1 | 9/2010 | Rofougaran et al. |
| 2010/0225520 A1 | 9/2010 | Mohamadi et al. |
| 2010/0225556 A1 | 9/2010 | Rofougaran et al. |
| 2010/0225557 A1 | 9/2010 | Rofougaran et al. |
| 2010/0232323 A1 | 9/2010 | Kubler et al. |
| 2010/0234045 A1 | 9/2010 | Karr et al. ............... 455/456.1 |
| 2010/0246558 A1 | 9/2010 | Harel |
| 2010/0254356 A1 | 10/2010 | Tynderfeldt et al. |
| 2010/0255774 A1 | 10/2010 | Kenington |
| 2010/0258949 A1 | 10/2010 | Henderson et al. |
| 2010/0260063 A1 | 10/2010 | Kubler et al. |
| 2010/0261501 A1 | 10/2010 | Behzad et al. |
| 2010/0273504 A1 | 10/2010 | Bull et al. ............... 455/456.1 |
| 2010/0284323 A1 | 11/2010 | Tang et al. |
| 2010/0290355 A1 | 11/2010 | Roy et al. |
| 2010/0291949 A1 | 11/2010 | Shapira et al. ............... 455/456.1 |
| 2010/0309049 A1 | 12/2010 | Reunamäki et al. |
| 2010/0309752 A1 | 12/2010 | Lee et al. |
| 2010/0311472 A1 | 12/2010 | Rofougaran et al. |
| 2010/0311480 A1 | 12/2010 | Raines et al. |
| 2010/0317371 A1 | 12/2010 | Westerinen et al. |
| 2010/0329161 A1 | 12/2010 | Ylanen et al. |
| 2010/0329166 A1 | 12/2010 | Mahany et al. |
| 2011/0007724 A1 | 1/2011 | Mahany et al. |
| 2011/0007733 A1 | 1/2011 | Kubler et al. |
| 2011/0019999 A1 | 1/2011 | George et al. ............... 398/58 |
| 2011/0021146 A1 | 1/2011 | Pernu |
| 2011/0021224 A1 | 1/2011 | Koskinen et al. |
| 2011/0026932 A1 | 2/2011 | Yeh et al. |
| 2011/0028157 A1 | 2/2011 | Larsen ............... 455/456.1 |
| 2011/0028161 A1 | 2/2011 | Larsen ............... 455/456.1 |
| 2011/0050501 A1 | 3/2011 | Aljadeff ............... 342/387 |
| 2011/0065450 A1 | 3/2011 | Kazmi |
| 2011/0066774 A1 | 3/2011 | Rofougaran |
| 2011/0069668 A1 | 3/2011 | Chion et al. |
| 2011/0071734 A1 | 3/2011 | Van Wiemeersch et al. |
| 2011/0086614 A1 | 4/2011 | Brisebois et al. ............... 455/411 |
| 2011/0116572 A1 | 5/2011 | Lee et al. |
| 2011/0122912 A1 | 5/2011 | Benjamin et al. |
| 2011/0124347 A1 | 5/2011 | Chen et al. ............... 455/456.1 |
| 2011/0126071 A1 | 5/2011 | Han et al. |
| 2011/0149879 A1 | 6/2011 | Noriega et al. |
| 2011/0158298 A1 | 6/2011 | Djadi et al. |
| 2011/0159876 A1 | 6/2011 | Segall et al. ............... 45/442 |
| 2011/0159891 A1 | 6/2011 | Segall et al. ............... 455/456.3 |
| 2011/0171912 A1 | 7/2011 | Beck et al. ............... 455/67.11 |
| 2011/0171946 A1 | 7/2011 | Soehren ............... 455/418 |
| 2011/0171973 A1 | 7/2011 | Beck et al. ............... 455/456.2 |
| 2011/0182230 A1 | 7/2011 | Ohm et al. |
| 2011/0194475 A1 | 8/2011 | Kim et al. |
| 2011/0201368 A1 | 8/2011 | Faccin et al. |
| 2011/0204504 A1 | 8/2011 | Henderson et al. |
| 2011/0206383 A1 | 8/2011 | Chien et al. |
| 2011/0210843 A1 | 9/2011 | Kummetz ............... 340/517 |
| 2011/0211439 A1 | 9/2011 | Manpuria et al. |
| 2011/0215901 A1 | 9/2011 | Van Wiemeersch et al. |
| 2011/0222415 A1 | 9/2011 | Ramamurthi et al. |
| 2011/0222434 A1 | 9/2011 | Chen |
| 2011/0222619 A1 | 9/2011 | Ramamurthi et al. |
| 2011/0227795 A1 | 9/2011 | Lopez et al. |
| 2011/0244887 A1 | 10/2011 | Dupray et al. ............... 455/456.2 |
| 2011/0256878 A1 | 10/2011 | Zhu et al. |
| 2011/0268033 A1 | 11/2011 | Boldi et al. |
| 2011/0268452 A1 | 11/2011 | Beamon et al. |
| 2011/0274021 A1 | 11/2011 | He et al. |
| 2011/0281536 A1 | 11/2011 | Lee et al. |
| 2011/0312340 A1 | 12/2011 | Wu et al. ............... 455/456.1 |
| 2012/0039320 A1 | 2/2012 | Lemson et al. ............... 370/338 |
| 2012/0058775 A1 | 3/2012 | Dupray et al. ............... 455/456.1 |
| 2012/0081248 A1 | 4/2012 | Kennedy et al. ............... 342/118 |
| 2012/0087025 A1 | 4/2012 | Vartanian et al. ............... 367/118 |
| 2012/0130632 A1 | 5/2012 | Bandyopadhyay et al. .. 701/446 |
| 2012/0309336 A1 | 12/2012 | Tanaka et al. |
| 2013/0157664 A1 | 6/2013 | Chow et al. |

FOREIGN PATENT DOCUMENTS

| | | | |
|---|---|---|---|
| EP | 0851618 A2 | 7/1998 | |
| EP | 1227605 A2 | 7/2002 | |
| EP | 1347584 A2 | 9/2003 | |
| EP | 1448008 A1 | 8/2004 | |
| EP | 1954019 A1 | 8/2008 | |
| JP | 2002353813 A | 12/2002 | |
| JP | 2009288245 | 12/2009 | ............... G01S 1/80 |
| WO | 9603823 A1 | 2/1996 | |
| WO | 0072475 A1 | 11/2000 | |
| WO | 02087275 A2 | 10/2002 | |
| WO | 03024027 A1 | 3/2003 | |
| WO | 2006076600 A1 | 7/2006 | |
| WO | WO2008/099383 A2 | 8/2008 | ............... H04B 7/04 |
| WO | WO2008/099390 A3 | 8/2008 | ............... G01S 3/02 |
| WO | WO2009/081376 A3 | 7/2009 | ............... H04W 24/00 |
| WO | WO2009/097237 A1 | 8/2009 | ............... G01S 1/68 |
| WO | 2010090999 A1 | 8/2010 | |
| WO | WO2011/017700 A1 | 2/2011 | ............... H04B 7/02 |
| WO | WO2011/091859 A1 | 8/2011 | ............... H04W 64/00 |
| WO | WO2011/123336 A1 | 10/2011 | ............... H04B 10/12 |

(56) References Cited

FOREIGN PATENT DOCUMENTS

OTHER PUBLICATIONS

International Search Report and Written Opinion for PCT/US2011/029895 mailed Jul. 4, 2011, 12 pages.
International Search Report and Written Opinion for PCT/US2011/049122 mailed Jun. 6, 2012, 12 pages.
Girard, et al., Indoor Pedestrian Navigation Using Foot-Mounted IMU and Portable Ultrasound Range Sensors, www.mdpi.com/journal/sensors, Aug. 2, 2011, pp. 7606-7624.
Kim, et al, "Smartphone-Based Collaborative and Autonomous Radio Fingerprinting," IEEE Transactions on Systems, Man, and Cybernetics—Part C: Applications and Reviews, vol. 42, No. 1, Jan. 2012, pp. 112-122.
Mokni, et al., "Couples sonar inertial navigation system for pedestrian tracking," 8 pages.
"Safe Campus Solutions: Going Beyond Emergency Notification," www.alcatel-lucent.com, 8 pages.
"Cellular Specialties Introduces the First Simulcasted In-building Location-Based Tracking Solution," http://smart-grid.tmcnet.com/news/2009/09/14/4368300.htm, 2 pages.
Arredondo, Albedo et al., "Techniques for Improving In-Building Radio Coverage Using Fiber-Fed Distributed Antenna Networks," IEEE 46th Vehicular Technology Conference, Atlanta, Georgia, Apr. 28-May 1, 1996, pp. 1540-1543, vol. 3.
Cho et al. "The Forward Link Performance of a PCS System with an AGC," 4th CDMA International Conference and Exhibition, "The Realization of IMT-2000," 1999, pp. 236-240, vol. 2.
Chu, Ta-Shing S. et al. "Fiber optic microcellular radio", IEEE Transactions on Vehicular Technology, Aug. 1991, pp. 599-606, vol. 40, Issue 3.
Cutrer, David M. et al., "Dynamic Range Requirements for Optical Transmitters in Fiber-Fed Microcellular Networks," IEEE Photonics Technology Letters, May 1995, pp. 564-566, vol. 7, No. 5.
Dolmans, G. et al. "Performance study of an adaptive dual antenna handset for indoor communications", IEE Proceedings: Microwaves, Antennas and Propagation, Apr. 1999, pp. 138-144, vol. 146, Issue 2.
Ellinger, Frank et al., "A 5.2 GHz variable gain LNA MMIC for adaptive antenna combining", IEEE Radio Frequency Integrated Circuits (RFIC) Symposium, Anaheim, California, Jun. 13-15, 1999, pp. 197-200.
Fan, J.C. et al., "Dynamic range requirements for microcellular personal communication systems using analog fiber-optic links", IEEE Transactions on Microwave Theory and Techniques, Aug. 1997, pp. 1390-1397, vol. 45, Issue 8.
Schweber, Bill, "Maintaining cellular connectivity indoors demands sophisticated design," EDN Network, Dec. 21, 2000, 2 pages, http://www.edn.com/design/integrated-circuit-design/4362776/Maintaining-cellular-connectivity-indoors-demands-sophisticated-design.
Windyka, John et al., "System-Level Integrated Circuit (SLIC) Technology Development for Phased Array Antenna Applications," Contractor Report 204132, National Aeronautics and Space Administration, Jul. 1997, 94 pages.
Decision on Appeal for U.S. Appl. No. 11/451,237 mailed Mar. 19, 2013, 7 pages.
Decision on Rejection for Chinese patent application 200780022093.6 mailed Feb. 5, 2013, 9 pages.
Gansemer, Sebastian et al., "RSSI-based Euclidean Distance Algorithm for Indoor Positioning adapted for the use in dynamically changing WLAN environments and multi-level buildings," International Conference on Indoor Positioning and Indoor Navigation (IPIN), Sep. 15-17, 2010, Zurich, Switzerland, 2 pages.
Chow et al, "Radio-over-Fiber Distributed Antenna System for WiMAX Bullet Train Field Trial," IEEE Mobile WiMAX Symposium, Jul. 9-10, 2009, Napa Valley, California, 4 pages.
Non-final Office Action for U.S. Appl. No. 13/365,843 mailed Jun. 26, 2013, 10 pages.
Notice of Allowance for U.S. Appl. No. 13/365,843 mailed Jul. 31, 2013, 8 pages.
Non-final Office Action for U.S. Appl. No. 13/485,038 mailed Dec. 20, 2013, 13 pages.
Non-final Office Action for U.S. Appl. No. 14/034,948 mailed Sep. 2, 2014, 11 pages.
Translation of First Office Action for Chinese Patent Application No. 201180019718.X, Issued on Jul. 16, 2014, 15 pages.

\* cited by examiner

LOCALIZATION SERVICES IN OPTICAL FIBER-BASED DISTRIBUTED COMMUNICATIONS COMPONENTS AND SYSTEMS, AND RELATED METHODS

RELATED APPLICATIONS

This application is a continuation of International Application No. PCT/US11/29895 filed Mar. 25, 2011, which claims the benefit of priority to U.S. Provisional Patent Application Ser. No. 61/319,659 filed Mar. 31, 2010, both applications being incorporated herein by reference.

BACKGROUND

1. Field of the Disclosure

The technology of the disclosure relates to optical fiber-based distributed communications systems for distributing radio-frequency (RF) signals over optical fiber to remote antenna units, and related control systems and methods.

2. Technical Background

Wireless communication is rapidly growing, with ever-increasing demands for high-speed mobile data communication. As an example, so-called "wireless fidelity" or "WiFi" systems and wireless local area networks (WLANs) are being deployed in many different types of areas (e.g., coffee shops, airports, libraries, etc.). Distributed communications systems communicate with wireless devices called "clients," which must reside within the wireless range or "cell coverage area" in order to communicate with an access point device.

One approach to deploying a distributed communications system involves the use of radio frequency (RF) antenna coverage areas, also referred to as "antenna coverage areas." Antenna coverage areas can have a radius in the range from a few meters up to twenty meters as an example. Combining a number of access point devices creates an array of antenna coverage areas. Because the antenna coverage areas each cover small areas, there are typically only a few users (clients) per antenna coverage area. This allows for minimizing the amount of bandwidth shared among the wireless system users. It may be desirable to provide antenna coverage areas in a building or other facility to provide distributed communications system access to clients within the building or facility. However, it may be desirable to employ optical fiber to distribute communication signals. Benefits of optical fiber include increased bandwidth.

One type of distributed communications system for creating antenna coverage areas, called "Radio-over-Fiber" or "RoF," utilizes RF signals sent over optical fibers. Such systems can include a head-end station optically coupled to a plurality of remote antenna units that each provide antenna coverage areas. The remote antenna units can each include RF transceivers coupled to an antenna to transmit RF signals wirelessly, wherein the remote antenna units are coupled to the head-end station via optical fiber links. The RF transceivers in the remote antenna units are transparent to the RF signals. The remote antenna units convert incoming optical RF signals from the optical fiber link to electrical RF signals via optical-to-electrical (O/E) converters, which are then passed to the RF transceiver. The RF transceiver converts the electrical RF signals to electromagnetic signals via antennas coupled to the RF transceiver provided in the remote antenna units. The antennas also receive electromagnetic signals (i.e., electromagnetic radiation) from clients in the antenna coverage area and convert them to electrical RF signals (i.e., electrical RF signals in wire). The remote antenna units then convert the electrical RF signals to optical RF signals via electrical-to-optical (E/O) converters. The optical RF signals are then sent to the head-end station via the optical fiber link.

It may be desired to provide such optical fiber-based distributed communications systems indoors, such as inside a building or other facility, to provide indoor wireless communication for clients. Otherwise, wireless reception may be poor or not possible for wireless communication clients located inside the building. In this regard, the remote antenna units can be distributed throughout locations inside a building to extend wireless communication coverage throughout the building. Other services may be negatively affected or not possible due to the indoor environment. For example, it may be desired or required to provide localization services for a client, such as emergency 911 (E911) services as an example. If the client is located indoors, techniques such as global positioning services (GPSs) may not be possible to provide or determine the location of the client. Further, triangulation techniques from the outside network may not be able to determine the location of the client.

SUMMARY OF THE DETAILED DESCRIPTION

Embodiments disclosed in the detailed description include optical fiber-based distributed communications components and systems, and related methods to provide localization services for client devices. The localization services allow the providing and/or determination of the location of client devices in communication with a component or components of the optical fiber-based distributed communications system. The location of client devices can be provided and/or determined based on knowledge of the location of the component or components in the optical fiber-based distributed communications system in communication with the client device. In this scenario, the client device would be known to be within communication range of such component or components. This information can be used to determine or provide a more precise area of location of the client device. The optical fiber-based distributed communications components and systems, and related methods disclosed herein may be well-suited for indoor environments where other methods of providing and/or determining the location of client devices may be obstructed or not possible due to the indoor environment.

In this regard, in certain embodiments disclosed herein, distributed communications equipment is provided. The distributed communications equipment supports optical fiber-based distributed communications services. The distributed communications apparatus in this embodiment also supports providing a signal used for determining the location of client devices (also referred to herein as "tracking signal") to remote antenna units (RAUs) configured to provide communications with client devices. The tracking signal may be generated by a tracking signal generator or pilot or beacon generator, as examples. The tracking signal is a unique signal that can be associated to a particular location or zone in the optical fiber-based distributed communications system. The location of the client device can be determined by correlating client device identification information with the ability of the client device to receive the tracking signal. The location of the client device can be determined by the distributed communications apparatus or other processing units coupled to the distributed communications apparatus over a network.

In this regard, the distributed communications apparatus includes at least one first downlink input configured to receive downlink electrical radio frequency (RF) communications signals. The distributed communications apparatus also includes at least one uplink output configured to receive and communicate uplink electrical RF communications signals from a communications uplink The distributed communications apparatus also includes at least one optical interface (OI) configured to receive and convert the downlink electrical RF communications signals into downlink optical RF communications signals to be provided to at least one RAU, and receive and convert uplink optical RF communications signals from at least one RAU on the communications uplink into uplink electrical RF communications signals provided to the at least one uplink output. The distributed communications apparatus also includes at least one second downlink input configured to receive at least one electrical tracking signal. The at least one OI is further configured to receive and convert the at least one electrical tracking signal into at least one optical tracking signal to be provided to at least one RAU. The distributed communications apparatus may be configured to not split or combine the tracking signal so that the uniqueness of the correlation of the tracking signal to a particular component or components in the optical fiber-based distributed communications system is not lost and is retained. Related methods are also disclosed.

In other embodiments, a distributed communications apparatus is provided that is configured to support receiving client device identification information as uplink communication data from an RAU without receiving and providing a tracking signal to the RAU. By knowing and correlating the location of particular components within the optical fiber-based distributed communications system, the distributed communications apparatus and/or other systems coupled to the distributed communications apparatus over a network are able to determine and/or provide the location of the client device. The component or components with which the client device is in communication can be associated with identification information of the client device.

In this regard, the distributed communications apparatus includes at least one first downlink input configured to receive downlink electrical RF communications signals. The distributed communications apparatus also includes at least one uplink output configured to receive and communicate uplink electrical RF communications signals from a communications uplink. The distributed communications apparatus also includes an OI configured to receive and convert the downlink electrical RF communications signals into downlink optical RF communications signals to be provided to at least one RAU, and receive and convert uplink optical RF communications signals that include client device identification information from the at least one RAU on the communications uplink into uplink electrical RF communications signals provided to the at least one uplink output. To retain the distinctiveness of communications from the components in the optical fiber-based communications system for providing localization services, the distributed communications apparatuses may, for example, be configured to not split or combine uplink electrical RF communication signals from an RAU among the plurality of RAUs with uplink electrical RF communication signals from another RAU among the plurality of RAUs. Alternatively, the distributed communications apparatus may, for example, be configured to not split or combine the uplink electrical RF communication signals from the OI with uplink electrical RF communication signals from another OI.

Additional features and advantages will be set forth in the detailed description which follows, and in part will be readily apparent to those skilled in the art from that description or recognized by practicing the embodiments as described herein, including the detailed description that follows, the claims, as well as the appended drawings.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

DETAILED DESCRIPTION

Reference will now be made in detail to the embodiments, examples of which are illustrated in the accompanying drawings, in which some, but not all embodiments are shown. Indeed, the concepts may be embodied in many different forms and should not be construed as limiting herein; rather, these embodiments are provided so that this disclosure will satisfy applicable legal requirements. Whenever possible, like reference numbers will be used to refer to like components or parts.

Embodiments disclosed in the detailed description include optical fiber-based distributed communications components and systems, and related methods to provide localization services for client devices. The localization services allow the providing and/or determination of the location of client devices in communication with a component or components of the optical fiber-based distributed communications system. The location of client devices can be provided and/or determined based on knowledge of the location of the component or components in the optical fiber-based distributed communications system in communication with the client device. In this scenario, the client device would be known to be within communication range of such component or components. This information can be used to determine or provide a more precise area of location of the client device. The optical fiber-based distributed communications components and systems, and related methods disclosed herein may be well-suited for indoor environments where other methods of providing and/or determining the location of client devices may be obstructed or not possible due to the indoor environment.

Figure 1:
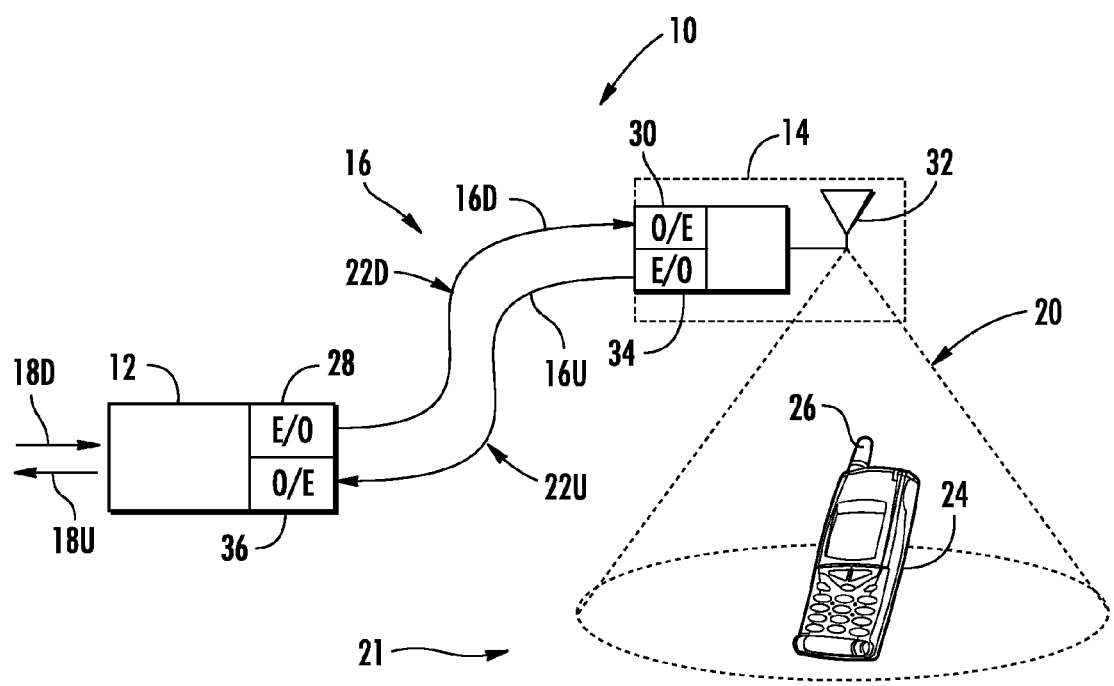
FIG. 1 is a schematic diagram of an exemplary optical fiber-based distributed communications system.
Figure 2:
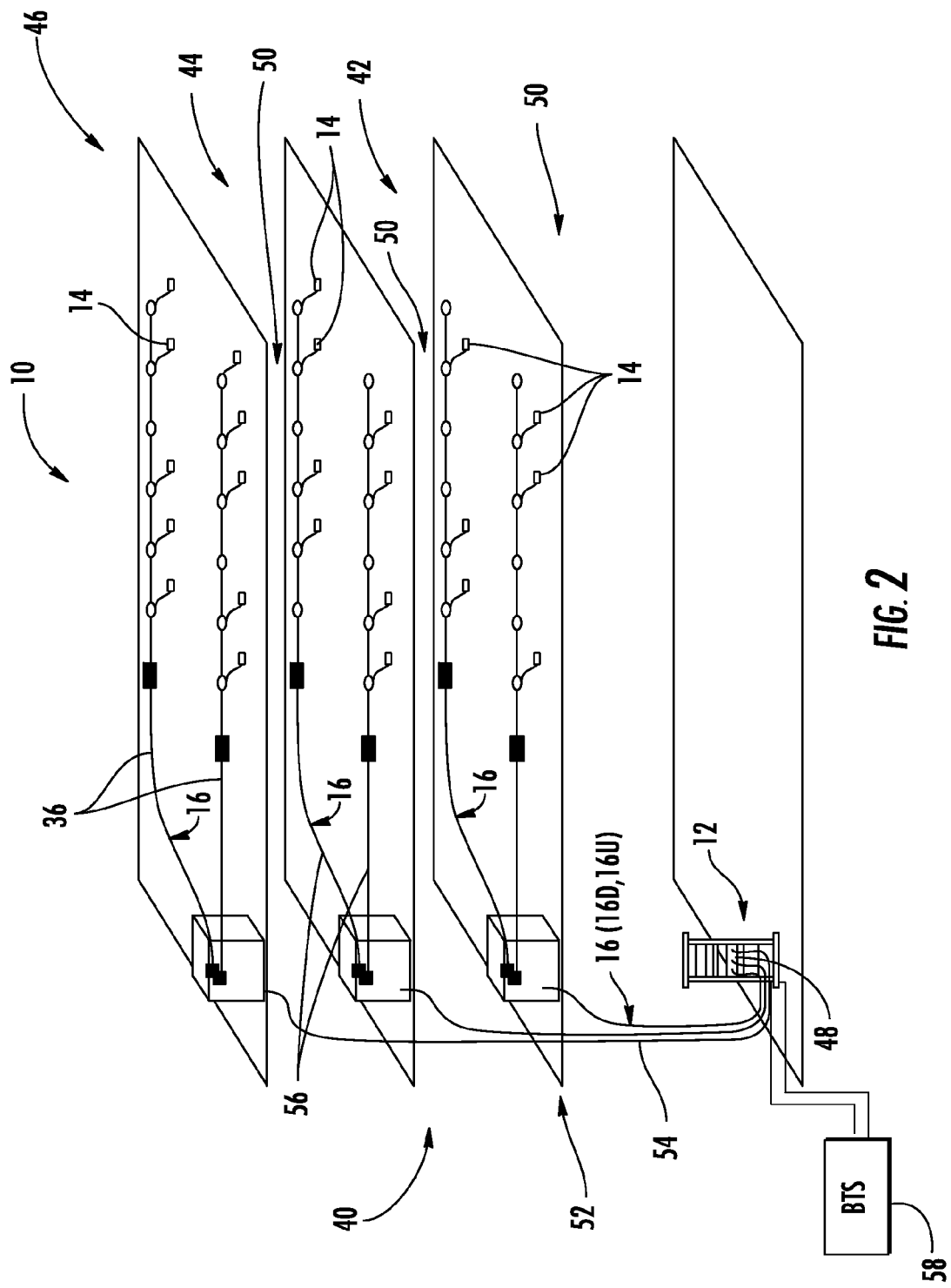
FIG. 2 is a partially schematic cut-away diagram of an exemplary building infrastructure in which an optical fiber-based distributed communications system is employed.
Figure 3:
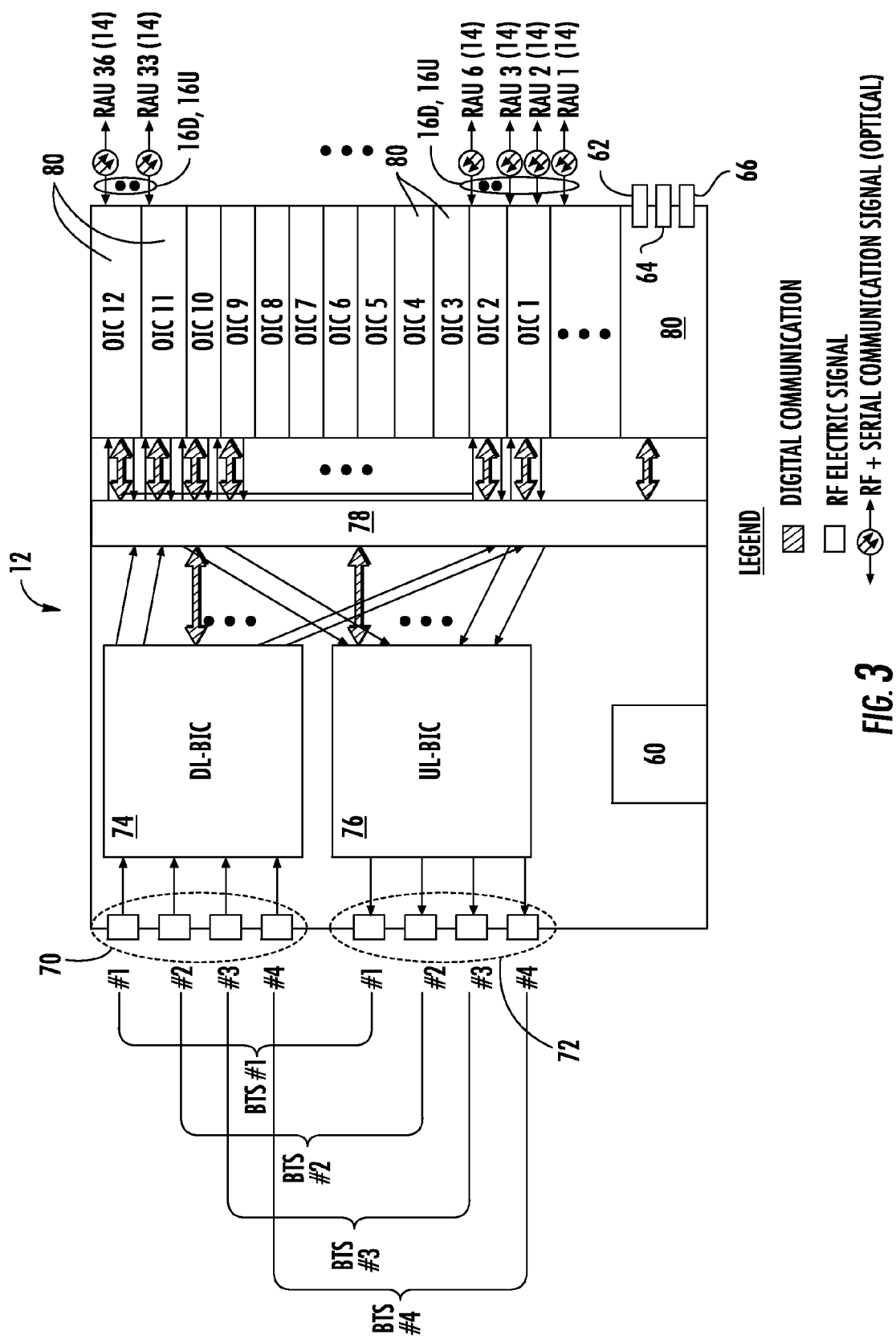
FIG. 3 is an exemplary schematic diagram of exemplary head-end equipment in the form of a head-end unit (HEU) deployed in the optical fiber-based distributed communications system of FIGS. 1 and 2.
Figure 4:
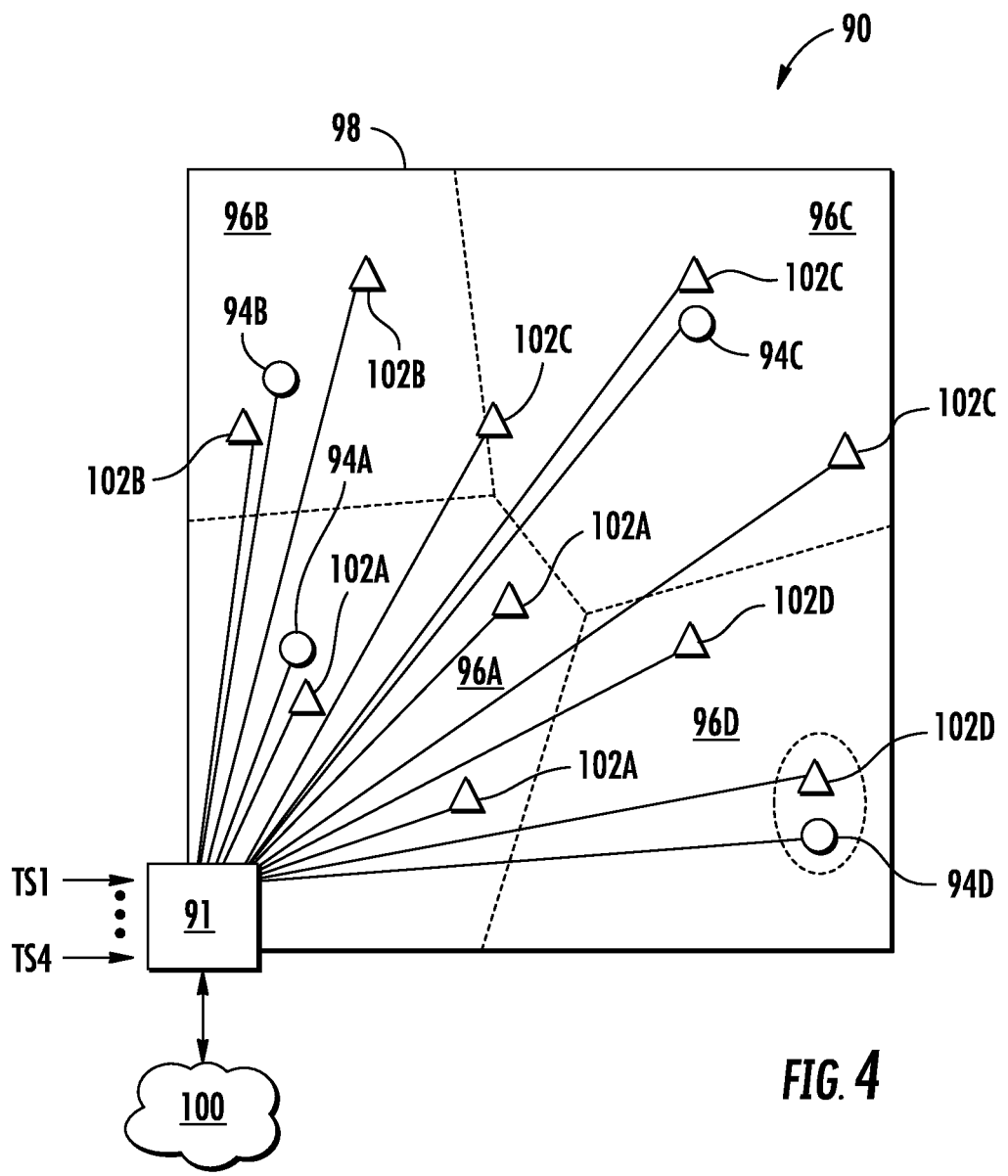
FIG. 4 is a schematic diagram of an exemplary optical fiber-based distributed communications system configured to communicate tracking signals to tracking remote antenna units (RAUs) to provide localization services for client devices.

Before discussing the exemplary components, systems, and methods of providing localization services in an optical fiber-based distributed communications system, which starts at FIG. 4, an exemplary generalized optical fiber-based distributed communications is first described with regard to FIGS. 1-3. In this regard, FIG. 1 is a schematic diagram of a generalized embodiment of an optical fiber-based distributed communications system. In this embodiment, the system is an optical fiber-based distributed communications system 10 that is configured to create one or more antenna coverage areas for establishing communications with wireless client devices located in the radio frequency (RF) range of the antenna coverage areas. In this regard, the optical fiber-based distributed communications system 10 includes head-end equipment, exemplified as a head-end unit or HEU 12, one or more remote antenna units (RAUs) 14 and an optical fiber link 16 that optically couples the HEU 12 to the RAU 14. The HEU 12 is configured to receive communications over downlink electrical RF signals 18D from a source or sources, such as a network or carrier as examples, and provide such communications to the RAU 14. The HEU 12 is also configured to return communications received from the RAU 14, via uplink electrical RF signals 18U, back to the source or sources. In this regard, in this embodiment, the optical fiber link 16 includes at least one downlink optical fiber 16D to carry signals communicated from the HEU 12 to the RAU 14 and at least one uplink optical fiber 16U to carry signals communicated from the RAU 14 back to the HEU 12.

The optical fiber-based wireless system 10 has an antenna coverage area 20 that can be substantially centered about the RAU 14. The antenna coverage area 20 of the RAU 14 forms an RF coverage area 21. The HEU 12 is adapted to perform or to facilitate any one of a number of Radio-over-Fiber (RoF) applications, such as radio-frequency (RF) identification (RFID), wireless local-area network (WLAN) communication, or cellular phone service. Shown within the antenna coverage area 20 is a client device 24 in the form of a mobile device as an example, which may be a cellular telephone as an example. The client device 24 can be any device that is capable of receiving RF communication signals. The client device 24 includes an antenna 26 (e.g., a wireless card) adapted to receive and/or send electromagnetic RF signals.

With continuing reference to FIG. 1, to communicate the electrical RF signals over the downlink optical fiber 16D to the RAU 14, to in turn be communicated to the client device 24 in the antenna coverage area 20 formed by the RAU 14, the HEU 12 includes an electrical-to-optical (E/O) converter 28. The E/O converter 28 converts the downlink electrical RF signals 18D to downlink optical RF signals 22D to be communicated over the downlink optical fiber 16D. The RAU 14 includes an optical-to-electrical (O/E) converter 30 to convert received downlink optical RF signals 22D back to electrical RF signals to be communicated wirelessly through an antenna 32 of the RAU 14 to client devices 24 located in the antenna coverage area 20.

Similarly, the antenna 32 is also configured to receive wireless RF communications from client devices 24 in the antenna coverage area 20. In this regard, the antenna 32 receives wireless RF communications from client devices 24 and communicates electrical RF signals representing the wireless RF communications to an E/O converter 34 in the RAU 14. The E/O converter 34 converts the electrical RF signals into uplink optical RF signals 22U to be communicated over the uplink optical fiber 14U. An O/E converter 36 provided in the HEU 12 converts the uplink optical RF signals 22U into uplink electrical RF signals, which can then be communicated as uplink electrical RF signals 18U back to a network or other source. The HEU 12 in this embodiment is not able to distinguish the location of the client devices 24 in this embodiment. The client device 24 could be in the range of any antenna coverage area 20 formed by an RAU 14.

To provide further exemplary illustration of how an optical fiber-based distributed communications system can be deployed indoors, FIG. 2 is a partially schematic cut-away diagram of a building infrastructure 40 employing the optical fiber-based distributed communications system 10 of FIG. 1. The building infrastructure 40 generally represents any type of building in which the optical fiber-based distributed communications system 10 can be deployed. As previously discussed with regard to FIG. 1, the optical fiber-based distributed communications system 10 incorporates the HEU 12 to provide various types of communication services to coverage areas within the building infrastructure 40, as an example. For example, as discussed in more detail below, the optical fiber-based distributed communications system 10 in this embodiment is configured to receive wireless radio-frequency (RF) signals and convert the RF signals into Radio-over-Fiber (RoF) signals to be communicated over the optical fiber link 16 to the RAUs 14. The optical fiber-based distributed communications system 10 in this embodiment can be, for example, an indoor distributed antenna system (IDAS) to provide wireless service inside the building infrastructure 40. These wireless signals can include, but are not limited to, cellular service, wireless services such as RFID tracking, Wireless Fidelity (WiFi), local area network (LAN), and combinations thereof, as examples.

With continuing reference to FIG. 2, the building infrastructure 40 includes a first (ground) floor 42, a second floor 44, and a third floor 46. The floors 42, 44, 46 are serviced by the HEU 12 through a main distribution frame 48, to provide antenna coverage areas 50 in the building infrastructure 40. Only the ceilings of the floors 42, 44, 46 are shown in FIG. 2 for simplicity of illustration. In the example embodiment, a main cable 52 has a number of different sections that facilitate the placement of a large number of RAUs 14 in the building infrastructure 40. Each RAU 14 in turn services its own coverage area in the antenna coverage areas 50. The main cable 52 can include, for example, a riser section 54 that carries all of the downlink and uplink optical fibers 16D, 16U to and from the HEU 12. The main cable 52 can include one or more multi-cable (MC) connectors adapted to connect select downlink and uplink optical fibers 16D, 16U, along with an electrical power line, to a number of optical fiber cables 56.

The main cable 52 enables multiple optical fiber cables 56 to be distributed throughout the building infrastructure 40 (e.g., fixed to the ceilings or other support surfaces of each floor 42, 44, 46) to provide the antenna coverage areas 50 for the first, second and third floors 42, 44 and 46. In an example embodiment, the HEU 12 is located within the building infrastructure 40 (e.g., in a closet or control room), while in another example embodiment the HEU 12 may be located outside of the building infrastructure 40 at a remote location. A base transceiver station (BTS) 58, which may be provided by a second party such as a cellular service provider, is connected to the HEU 12, and can be co-located or located remotely from the HEU 12. A BTS is any station or source that provides an input signal to the HEU 12 and can receive a return signal from the HEU 12. In a typical cellular system, for example, a plurality of BTSs are deployed at a plurality of remote locations to provide wireless telephone coverage. Each BTS serves a corresponding cell and when a mobile station enters the cell, the BTS communicates with the mobile station. Each BTS can include at least one radio transceiver for enabling communication with one or more subscriber units operating within the associated cell.

To provide further detail on the components of the exemplary HEU 12 provided in the optical fiber-based distributed communications system 10 of FIGS. 1 and 2, FIG. 3 is provided. FIG. 3 is a schematic diagram of the HEU 12 to provide further detail. As illustrated therein, the HEU 12 in this embodiment includes a head-end controller (HEC) 60 that manages the functions of the HEU 12 components and communicates with external devices via interfaces, such as a RS-232 port 62, a Universal Serial Bus (USB) port 64, and an Ethernet port 68, as examples. The HEU 12 can be connected to a plurality of BTSs, transceivers, and the like via inputs 70, which may be BTS inputs or other inputs, and outputs 72, which may be BTS outputs or other outputs The inputs 70 are downlink connections and the outputs 72 are uplink connections, which can be provided in single connectors or together in a duplex connector. Each input 70 is connected to a downlink BTS interface card (BIC) 74 located in the HEU 12, and each output 72 is connected to an uplink BIC 76 also located in the HEU 12. The downlink BIC 74 is configured to receive incoming or downlink RF signals from the inputs 70 and split the downlink RF signals into copies to be communicated to the RAUs 14, as illustrated in FIG. 2. The uplink BIC 76 is configured to receive and combine outgoing or uplink RF signals from the RAUs 14 and split the uplink RF signals into individual inputs 70 as a return communication path.

The downlink BIC 74 is connected to a midplane interface card 78 panel in this embodiment. The uplink BIC 76 is also connected to the midplane interface card 78. The downlink BIC 74 and uplink BIC 76 can be provided in printed circuit boards (PCBs) that include connectors that can plug directly into the midplane interface card 78. The midplane interface card 78 is in electrical communication with a plurality of optical interface cards (OICs) 80, which provide an optical to electrical communication interface and vice versa between the RAUs 14 via the downlink and uplink optical fibers 16D, 16U and the downlink BIC 74 and uplink BIC 76. The OICs 80 include the E/O converter 28 in FIG. 1 that converts electrical RF signals from the downlink BIC 74 to optical RF signals, which are then communicated over the downlink optical fibers 16D to the RAUs 14 and then to client devices. The OICs 80 also include the O/E converter 36 in FIG. 1 that converts optical RF signals communicated from the RAUs 14 over the uplink optical fibers 16U to the HEU 12 and then to the outputs 72.

The OICs 80 in this embodiment support up to three (3) RAUs 14 each. The OICs 80 can also be provided in a PCB that includes a connector that can plug directly into the midplane interface card 78 to couple the links in the OICs 80 to the midplane interface card 78. The OICs 80 may consist of one or multiple optical interface cards (OICs). In this manner, the HEU 12 is scalable to support up to thirty-six (36) RAUs 14 in this embodiment since the HEU 12 can support up to twelve (12) OICs 80. If fewer than thirty-six (36) RAUs 14 are to be supported by the HEU 12, fewer than twelve OICs 80 can be included in the HEU 12 and plugged into the midplane interface card 78. One OIC 80 is provided for every three (3) RAUs 14 supported by the HEU 12 in this embodiment. OICs 80 can also be added to the HEU 12 and connected to the midplane interface card 78 if additional RAUs 14 are desired to be supported beyond an initial configuration. A head-end unit controller (HEU) 60 can also be provided that is configured to be able to communicate with the DL-BIC 74, the UL-BIC 76, and the OICs 80 to provide various functions, including configurations of amplifiers and attenuators provided therein.

It may be desired to provide localization services in the optical fiber-based distributed communications system 10 illustrated in FIGS. 1 and 2, as an example. For example, it may be desired to know or determine the location of client devices 24. Localization services may be desired or required to provide certain services, such as emergency 911 (E911) services in the case of a cellular client device. Localization services may require a certain percentage of client devices 24 to be locatable within a given distance to comply with requirements. For example, it may be desired or required by E911 services to be able to locate a given percentage of all client device users within one hundred (100) feet (ft.) as an example. Localization services may be desired or required for other types of wireless clients other than cellular clients as well. If the client device 24 is located inside the building infrastructure 40 and establishes communication with the HEU 12, it can be determined that the client device 24 is located within at least the distance between the farthest RAU 14 located from the HEU 12. However, it may not be possible to determine the location of the client device 24 with greater specificity and resolution. For example, in indoor environments, global positioning services (GPSs) provided in the client devices 24 may be inoperable to report a location.

If it could be determined to which particular components in the optical fiber-based communication system 10 a client device 24 establishes communications, this information could be used to determine the location of a client device 24. The client device 24 would be known to be within communication range of such component. This information coupled with knowing the location of the HEU 12 can be used to determine or provide a more precise area of location of the client device 24. In essence, the RAUs 14 provide another layer of location determination in addition to the location of the HEU 12. Cellular networks, for example, provide methods of determining location.

In this regard, certain embodiments are disclosed herein to provide an optical fiber-based distributed communications system that supports localization services for client devices located within antenna coverage areas created by RAUs. In certain embodiments disclosed herein, the client device is configured to include client device identification information as uplink communication data to the RAU and to the HEU and network connected thereto without receiving a tracking signal or other signal configured to provide localization services. For example, Global System for Mobile Communications (GSM) network compatible client devices are configured to automatically initiate providing client device identification information over the network. The locations of the RAUs in the system are also configured and known in the HEU. By knowing and correlating the particular RAU in which the client device established communication, the HEU is able to determine and/or provide the location of the client device as being within the antenna coverage area formed by the particular RAU. The correlation of client device identification information from the client device with the location of the RAU is retained when communicated to the HEU and is not lost by being combined, such as by splitters or containers, with communications from other RAUs.

In other embodiments, a signal used for determining the location of client devices (also referred to herein as "tracking signal"), and which may also be referred to as a pilot signal, beacon signal, or pilot beacon signal, is distributed by an HEU to at least one of the RAUs in an optical fiber-based distributed communications system. The tracking signal may be generated by a tracking signal generator or pilot or beacon generator as examples. The tracking signal is a unique signal that can be associated with a particular location or zone in the optical fiber-based distributed communications system. For example, in a code division multiple access (CDMA) network, cell identification is included in a channel separate from communications traffic that can be used as a tracking signal. In this manner, the tracking signal is radiated through the RAU to be communicated to client devices within range of the antenna coverage area formed by the RAU. When the client device wirelessly receives the tracking signal, the client device communicates its identification information and identification of the tracking signal to an RAU to be communicated back to the HEU. The HEU can provide this information to a network or carrier. In this manner, the client device identification information and identification of the tracking signal can be associated with the location of a particular RAU that received and transmitted the tracking signal in the optical fiber-based distributed communications system to provide or determine a location of the client device.

In this regard, FIG. 4 illustrates a schematic diagram of an exemplary optical fiber-based distributed communications system 90 that is configured to communicate tracking signals TS1-TS4 from an HEU 91 to certain tracking RAUs 94A-94D to provide localization services. The tracking RAUs 94A-94D can contain the same components and configuration as the RAUs 14. Thus, this configuration of the optical fiber-based distributed communications system 90 employs a tracking signal provided on downlinks to the RAUs 94A-94D to provide localization services. The difference is that the tracking RAUs 94A-94D are communicatively coupled to channels or links provided by the HEU 91 that are dedicated to carry a tracking signal. Each tracking signal TS1-TS4 has a unique identification from the other tracking signals TS1-TS4 in this embodiment. The tracking RAUs 94A-94D selected to receive tracking signals TS1-TS4 can be strategically located within different tracking zones 96 in a building 98 or other infrastructure. For example, FIG. 4 illustrates four tracking zones 96A-96D. Each tracking zone 96A-96D may represent a floor within the building 98 wherein a tracking RAU 94A-94D is located on each floor. In this embodiment, the tracking signal is not used for communications, and the client devices can receive the tracking signal from the tracking RAUs 94A-94D over a greater distance than communications. Thus, when client devices are located within range of a particular tracking RAU 94A-94D, the client device will receive the particular tracking signal TS1-TS4 designated for the floor communicated to the tracking RAU 94A-94D. The client device can then communicate client device identification information regarding the received tracking signal TS1-TS4 back to the HEU 91 and over a network 100. Thus, the particular floor in which the client device is located can be provided or determined. Note that although the example of tracking illustrates four (4) tracking zones 96A-96D, the disclosure herein is not limited to providing a particular number of tracking zones or tracking RAUs placed in the tracking zones to receive and wireless transmit a tracking signal to client devices.

With continuing reference to FIG. 4, other communications RAUs 102A-102D that are not configured to receive and wirelessly transmit the tracking signals TS1-TS4 are also provided in the optical fiber-based distributed communications system 90. In this embodiment, these communications RAUs 102A-102D form antenna coverage areas in each of the tracking zones 96A-96D that are not associated with providing tracking signals or location services. The communications RAUs 102A-102D are like the RAUs 14 previously described and illustrated in FIGS. 1 and 2 that provide downlink network communications to client devices in range of the antenna coverage areas and receive wireless communications from the client devices to communicate uplink communication data back to the HEU 91 and over the network 100. More than one communications RAU 102A-102D may be provided in a given zone 96A-96D to provide communications between client devices inside the building 98 and the network 100.

As also illustrated in FIG. 4, the tracking RAUs 94A-94D could also be configured to transmit downlink communication data to client devices in addition to the tracking signals TS1-TS4. For example, tracking RAU 94D is configured to receive both tracking signal TS3 and downlink communication data from the HEU 91 and transmit both to client devices in range of the tracking RAU 94D. When the client device in range of the tracking RAU 94D receives the tracking signal and the downlink communication data, the client device can transmit client device identification information and uplink communication data back to the HEU 91 and over the network 100. The tracking RAU 94D may be configured to receive uplink communication data from a client device, or may be configured to only transmit the tracking signal and downlink communication data to a client device. In the latter case, a second communications RAU 102D located in proximity to the tracking RAU 94D may be configured to receive the client device identification information and uplink communication data from the client device to provide to the HEU 91 and the network 100.

As previously discussed and illustrated in FIG. 3, the HEU 12 includes the downlink BIC 74 that combines downlink electrical RF signals received from the inputs 70. Further, the HEU 12 combines uplink electrical RF signals received from the OICs 80 carrying uplink information received by the RAUs 14 and then splits the combined uplink electrical RF signals out into individual outputs 72. Thus, if the HEU 12 in FIG. 3 were employed as the HEU 91 in FIG. 4 to provide the tracking signals TS1-TS4 to provide localization services, the uniqueness of the tracking signals TS1-TS4 would be lost and thus could not be used to associate the location of client devices to particular RAUs 14 to provide localization services. This is because the downlink BIC 74 would split the tracking signals TS1-TS4 into copies and communicate the copies of the tracking signals TS1-TS4 to each of the RAUs 14 instead of particular RAUs 14. Thus, client devices could receive tracking signals TS1-TS4 in any of the tracking zones 96A-96D in FIG. 4, as an example.

Embodiments disclosed herein can include modified HEUs that provide exemplary solutions to uniquely provide tracking signals on downlinks to certain designated tracking RAUs without copies of the tracking signals being communicated to each RAU. The tracking signals are not combined with the RF communication signals for communication traffic. The client devices can receive the tracking signal from individual tracking RAUs independent of RF communication signals and the uniqueness of associating particular client device identification information received from a client device to a particular tracking RAU is not lost, and thus the location of the client devices relative to tracking RAUs can be determined and/or provided.

Figure 5A:
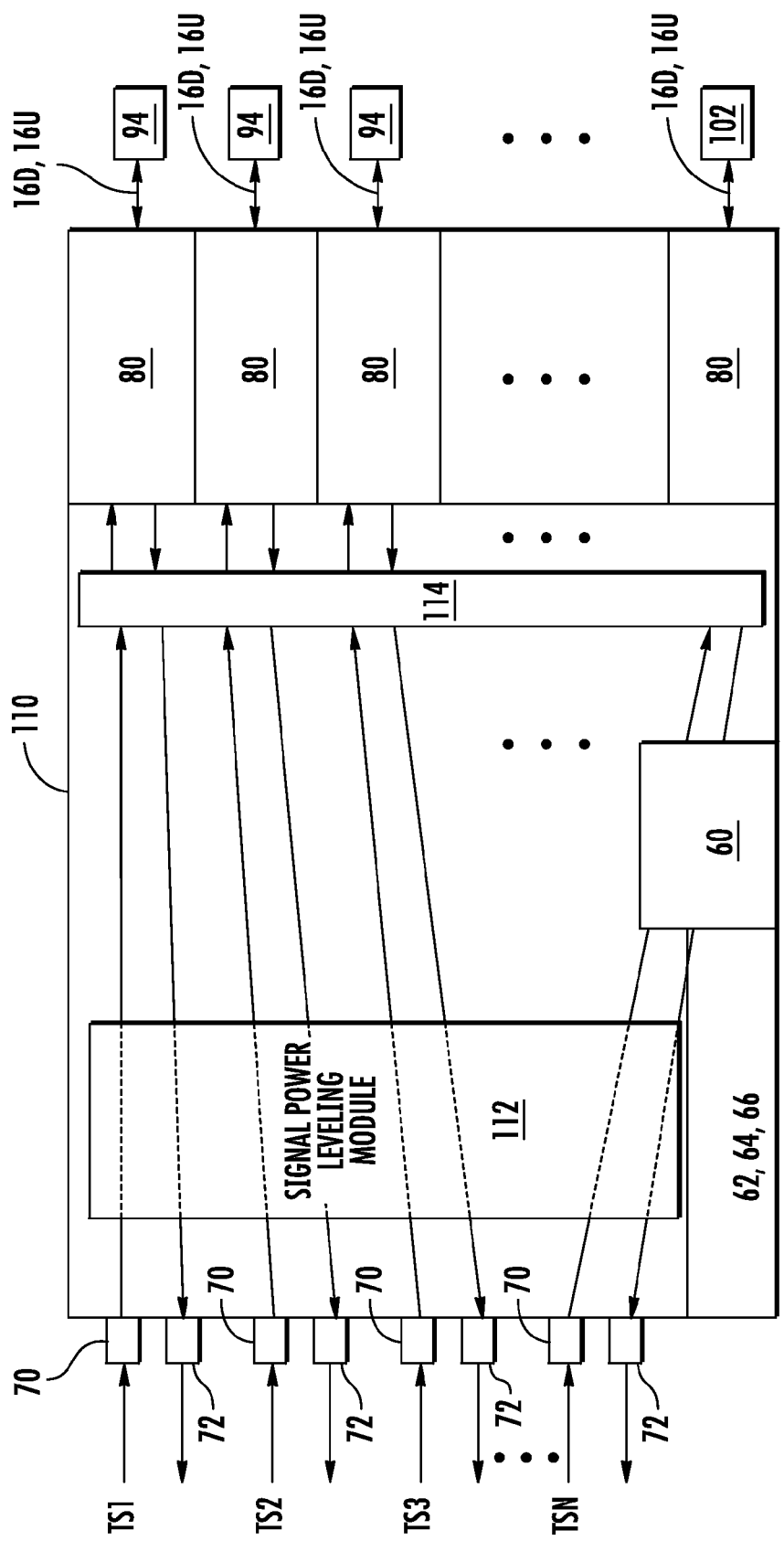
FIG. 5A is a schematic diagram of exemplary alternative head-end equipment configured to provide tracking signals to tracking RAUs to support providing localization services for client devices.

In this regard, FIG. 5A illustrates a schematic diagram of an exemplary embodiment of an alternative HEU 110 that is configured to provide tracking signals to RAUs 14 without splitting the tracking signals into copies that are distributed to multiple RAUs 14. The HEU 110 can be provided as the HEU 91 in FIG. 4. Thus, the association of a tracking signal to a particular RAU 14 is not lost as is the case in the HEU 12 of FIG. 3, where the downlink BIC 74 splits the downlink electrical RF signals into copies provided to each RAU 14. The HEU 110 does include some common components to the HEU 12 illustrated in FIG. 3. Where common components are included, common element numbers are used in FIG. 5A.

With continuing reference to FIG. 5A, the downlink BIC 74 of the HEU 12 of FIG. 3 has been removed so that tracking signals TS1-TS3 provided as inputs to the inputs 70 do not get split into copies provided to multiple tracking RAUs 94. The tracking signals TS1-TS3 are provided to dedicated tracking RAUs 94 so that a client device receiving a given tracking signal TS1-TS3 is known to be within the antenna coverage area of the tracking RAU 94 dedicated to receive a given tracking signal TS1-TS3. The HEU 110 is also configured to receive communication signals CS (FIG. 6) to be provided to communications RAUs 102 that are not used to receive and communicate the tracking signals TS1-TS3, as also illustrated in FIG. 4. In response to receipt of a tracking signal TS1-TS3 from a tracking RAU 94, a client device can return its client device identification information over the uplink optical fibers 16U to the HEU 110. In this regard, it is known that the client device is within the antenna coverage area of the tracking RAU 94 receiving communications from the client device. Thus, this information can be retained by the HEC 60 in the HEU 110 and/or provided to the network 100 (FIG. 4) to determine and/or provide the location of the client device as being within the antenna coverage area of the tracking RAU 94.

In the example HEU 110 of FIG. 5A, three tracking signals TS1-TS3 are provided as inputs to three inputs 70; however, more or less tracking signals could be provided. The electrical RF signals received in the inputs 70 may be provided to a signal power leveling module 112 to level the power between different signals provided to different inputs 70, if desired. However, the tracking signals TS1-TS3 are not combined or split in the signal power leveling module 112. A connector panel 114 may also be provided in the HEU 110 to receive the electrical RF signals from the inputs 70 and provide a connection to OICs 80 to convert the electrical RF signals to optical RF signals, as previously discussed. The signal power leveling module 112 and OICs 80 may be disposed, for example, in printed circuit board (PCB) cards that can be plugged into connectors disposed in the connector panel 114 to connect the outputs and inputs of the signal power leveling module 112 to the inputs and outputs, respectively, of the OICs 80. The connector panel 114 may also be a PCB card that contains circuitry or other components.

Figure 5B:
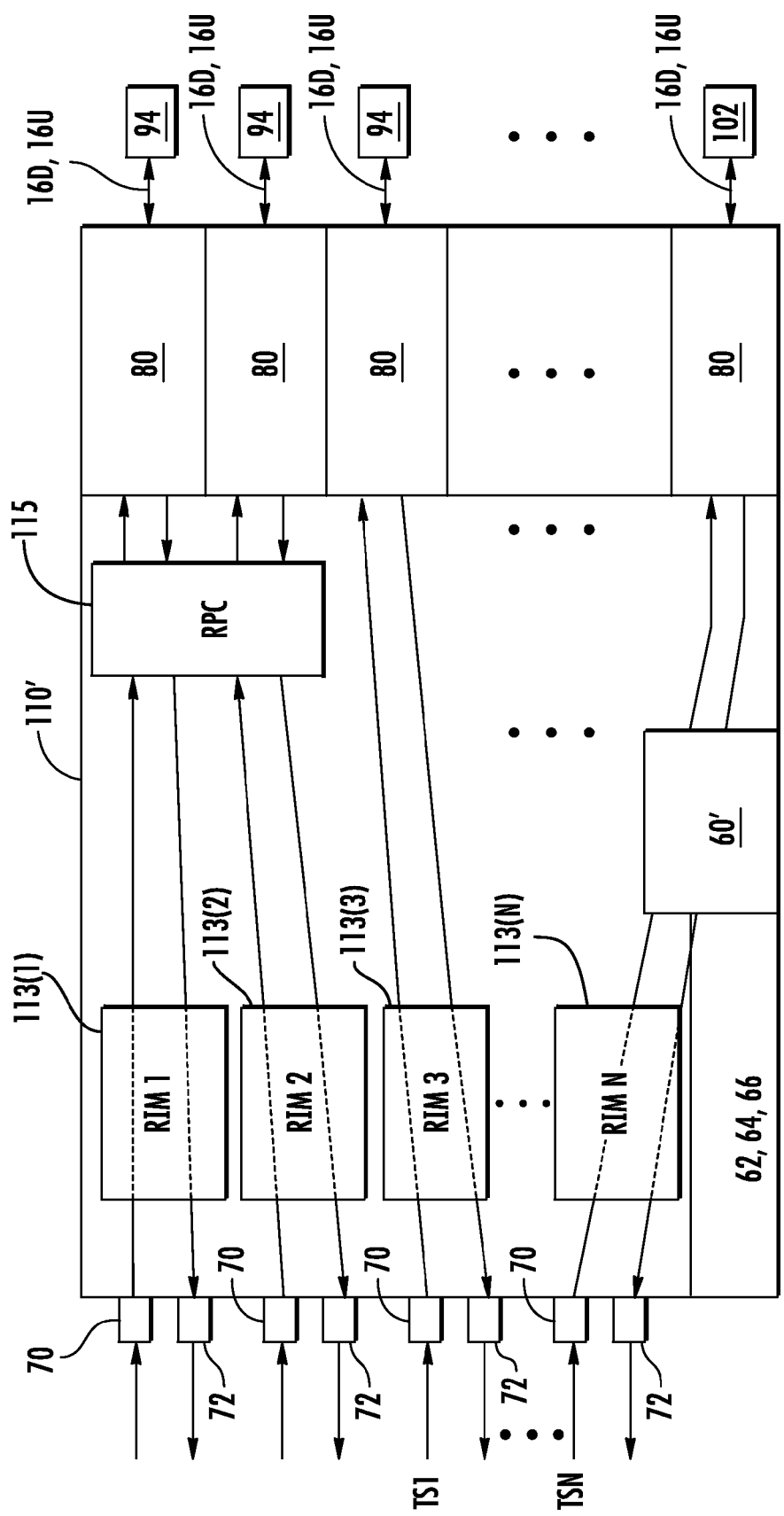
FIG. 5B is a schematic diagram of other exemplary alternative head-end equipment configured to provide tracking signals to tracking RAUs to support providing localization services for client devices.

FIG. 5B illustrates a schematic diagram of an exemplary embodiment of an alternative HEU 110' that is configured to provide tracking signals to RAUs 14 also without splitting the tracking signals into copies that are distributed to multiple RAUs 14. Thus, the association of a tracking signal to a particular RAU 14 is not lost as is the case in the HEU 12 of FIG. 3. The HEU 110' does include some common components to the HEU 12 illustrated in FIG. 3. Where common components are included, common element numbers are used in FIG. 5B.

With continuing reference to FIG. 5B, radio interface modules (RIMs) 113(1)-113(N) are provided that receive the downlink electrical RF signals from the inputs 70 to provide RF communications services. The notations "1-N" indicate that any number of the RIMs, 1-N, may be provided. Each RIM 113(1)-113(N) may support RF communication services for given frequencies or frequency ranges or bands. The downlink electrical RF signals are then combined in a radio distribution card or cards (RDC) 115 to be provided to the OIMs 80 and the RAUs 94, as previously discussed. The RIMs 113(1)-113(N) are configured to receive and process downlink electrical RF signals from the inputs 70 prior to optical conversion into downlink optical RF signals.

Each RIM 113(1)-113(N) can be designed to support a particular type of radio source or range of radio sources (i.e., frequencies) to provide flexibility in configuring the HEU 110' to support the desired radio sources. For example, one RIM 113 may be configured to support the Personal Communication Services (PCS) radio band. Another RIM 113 may be configured to support the Long Term Evolution (LTE) 700 radio band. In this example, by inclusion of these RIMs 113, the HEU 110' would be configured to support and distribute RF signals on both PCS and LTE 700 radio bands. RIMs 113 may be provided in the HEU 110' that support any other radio bands desired, including but not limited to PCS, LTE, CELL, GSM, CDMA, CDMA2000, TDMA, AWS, iDEN (e.g., 800 MHz, 900 MHz, and 1.5 GHz), Enhanced Data GSM Environment, (EDGE), Evolution-Data Optimized (EV-DO), 1xRTT (i.e., CDMA2000 1X (IS-2000)), High Speed Packet Access (HSPA), 3GGP1, 3GGP2, and Cellular Digital Packet Data (CDPD). More specific examples include, but are not limited to, radio bands between 400-2700 MHz including but not limited to 700 MHz (LTE), 698-716 MHz, 728-757 MHz, 776-787 MHz, 806-824 MHz, 824-849 MHz (US Cellular), 851-869 MHz, 869-894 MHz (US Cellular), 880-915 MHz (EU R), 925-960 MHz (TTE), 1930-1990 MHz (US PCS), 2110-2155 MHz (US AWS), 925-960 MHz (GSM 900), 1710-1755 MHz, 1850-1915 MHz, 1805-1880 (GSM 1800), 1920-1995 MHz, and 2110-2170 MHz (GSM 2100).

Figure 6:
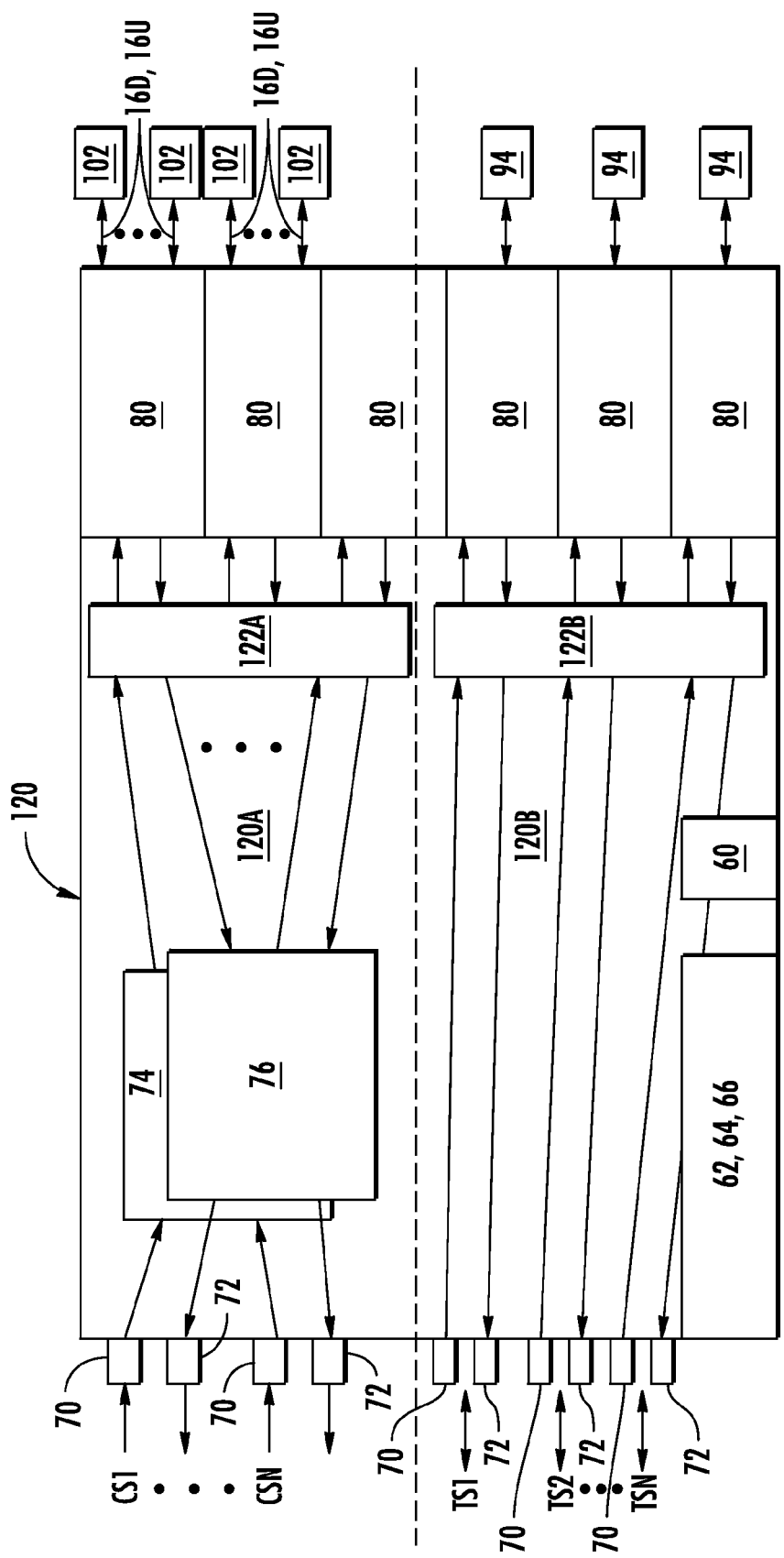
FIG. 6 is a schematic diagram of other exemplary alternative head-end equipment configured to provide communication signals to RAUs and tracking signals to tracking RAUs to support providing localization services for client devices.
Figure 7:
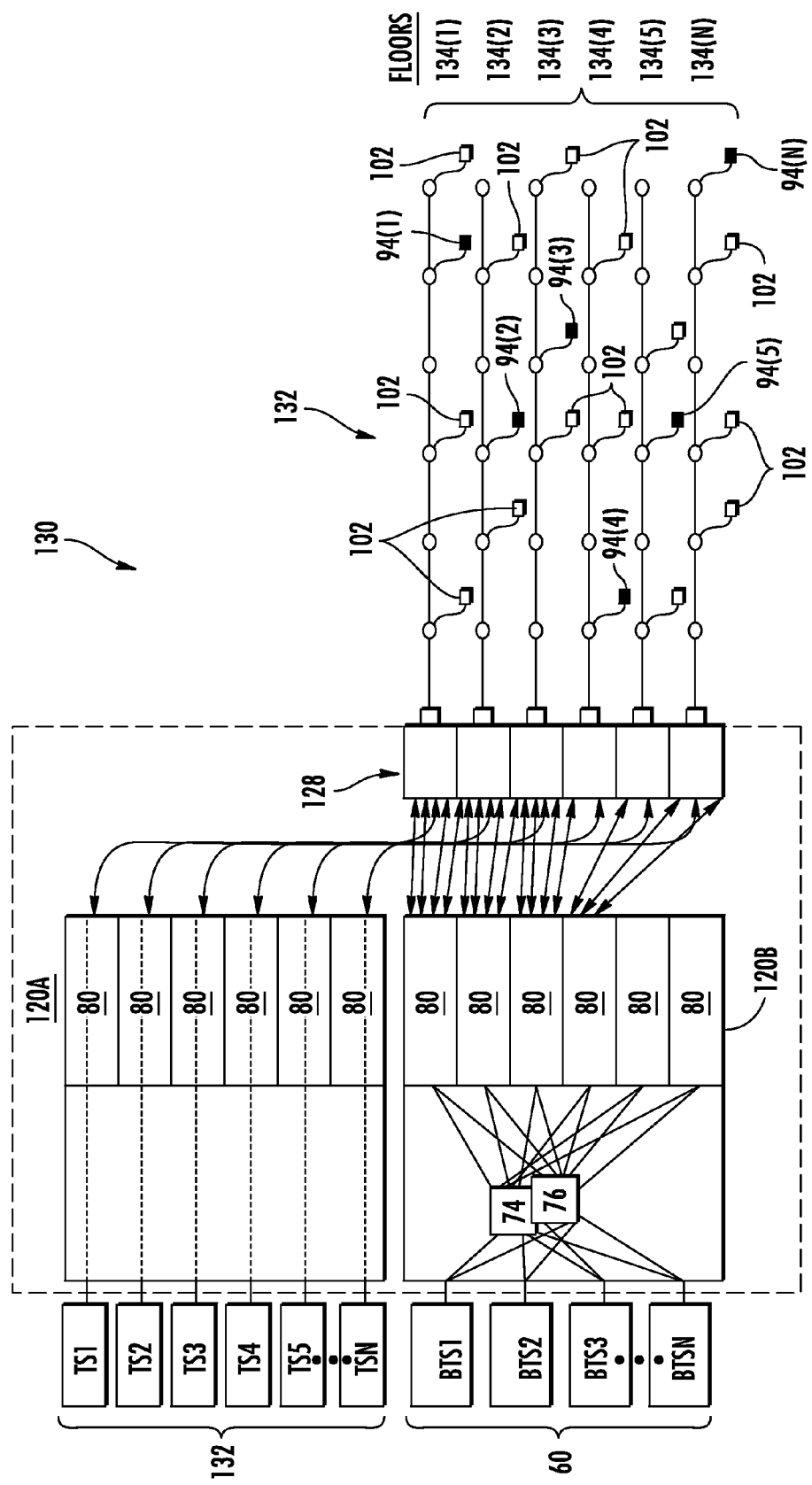
FIG. 7 is a schematic diagram of the head-end equipment in FIG. 6 provided in an optical fiber-based distributed communications system in a building containing at least one tracking RAU per floor.

With continuing reference to FIG. 5B, note that the tracking signals TS1-TSN are not provided to the RDC 115 where the tracking signals TS1-TSN are combined and split, but rather are provided to dedicated tracking RAUs 94 so that a client device receiving a given tracking signal TS1-TSN is known to be within the antenna coverage area of the tracking RAU 94 dedicated to receive a given tracking signal TS1-TSN. In this regard, HEU 110' is also configured to receive communication signals CS (FIG. 6) to be provided to communications RAUs 102 that are not used to receive and communicate the tracking signals TS1-TSN. In response to receipt of a tracking signal TS1-TSN from a tracking RAU 94, a client device can return its client device identification information over the uplink optical fibers 16U to the HEU 110'. In this regard, it is known that the client device is within the antenna coverage area of the tracking RAU 94 receiving communications from the client device. Thus, this information can be retained by the HEC 60' in the HEU 110' and/or provided to the network 100 (FIG. 4) to determine and/or provide the location of the client device as being within the antenna coverage area of the tracking RAU 94. In the HEU 110 of FIG. 5A, both the downlink BIC 74 and uplink BIC 76 from the HEU 12 of FIG. 3 were removed from both the tracking signal TS and communication signal CS communication paths through the HEU 110 to the RAUs 94, 102. However, it is not necessary to remove the downlink BIC 74 and the uplink BIC 76 from the communication signals CS communication paths. In the HEU 110' of FIG. 5B, the tracking signals TS1-TSN were not combined and split with downlink RF signals in the RDC 115. In this regard, FIG. 6 illustrates a schematic diagram of an exemplary alternative HEU 120 that is configured in a hybrid configuration. FIG. 7 illustrates the functionality of the HEU 120 provided in two separate HEUs 120A, 120B, each dedicated to either handle tracking signals TS or communication signals CS. The HEUs 120A, 120B are provided in an optical fiber-based distributed communications system 130 wherein RAUs 94, 102 are distributed in different floors of a building 132 similar to the optical fiber-based distributed communications system 10 in FIG. 2. One tracking RAU 94(1)-94(N) is provided for each floor 134(1)-134(N) in the building 132.

With reference back to FIG. 6, some communication paths are dedicated for tracking signals TS1-TSN and other communication paths are dedicated for communication signals CS1-CSN. In this regard, separate connection panels 122A, 122B are provided for each type of communication path for the HEUs 120A, 120B. The downlink BIC 74 and uplink BIC 76 are employed in the communication signal CS1-CSN communication paths in the HEU 120A to split copies of the communication signals CS1-CSN to be provided to the communications RAUs 102, as described previously and illustrated in the HEU 12 of FIG. 3. Alternatively in FIG. 6, RIMs may be employed in lieu of the downlink BIC 74 and uplink BIC 76. In this example, the downlink BIC 74 and uplink BIC 76 are not employed in the tracking signal TS1-TSN communication paths in the HEU 120B such that copies of the tracking signals TS1-TSN are not provided to multiple tracking RAUs 94, otherwise the ability to associate the tracking signals TS1-TSN to a particular tracking RAU 94 would be lost in this embodiment.

Figure 8:
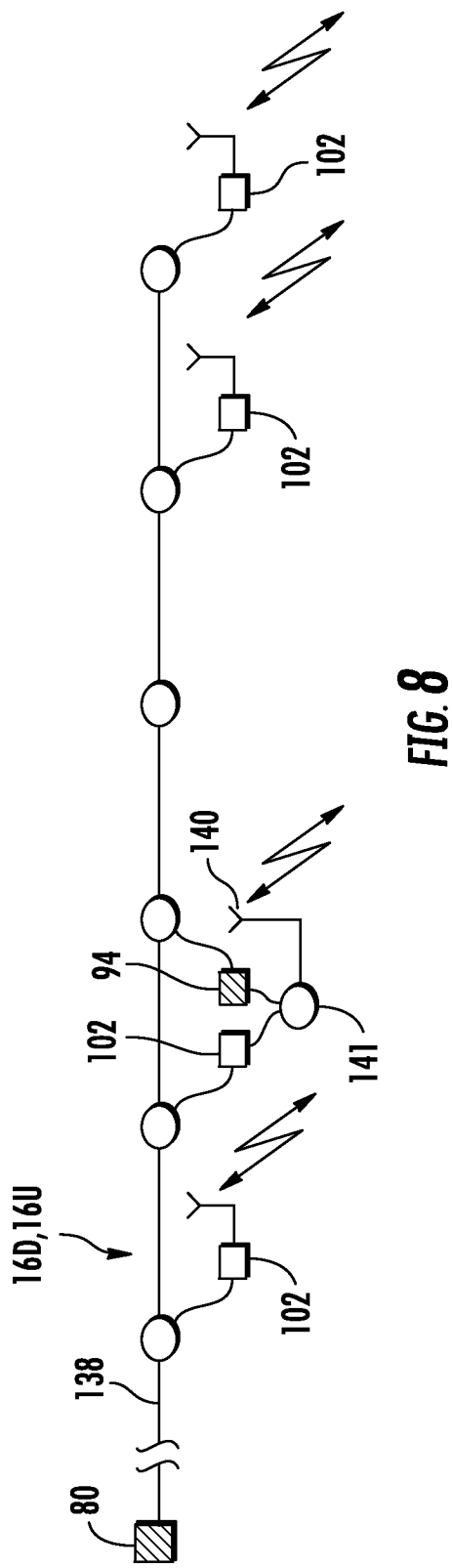
FIG. 8 is a schematic diagram of a fiber optic cable containing downlink and uplink optical fibers connected between an optical interface card(s) (OIC(s)) and RAUs, wherein an RAU and tracking RAU share a common antenna.

The tracking RAUs 94 and communications RAUs 102 may be provided as separate RAUs or may be configured to share components. For example, a tracking RAU 94 may be co-located with a communications RAU 102 and share the same antenna. In this regard, FIG. 8 illustrates an fiber optic cable 138 comprised of downlink optical fibers 16D and uplink optical fibers 16U connected to one or more OICs 80. In this embodiment, a tracking RAU 94 is provided that is co-located with a communications RAU 102, as illustrated in FIG. 8. In this regard, the tracking RAU 94 and communications RAU 102 may be configured to share some common components. For example, in this embodiment, the tracking RAU 94 and co-located communications RAU 102 share a common, single antenna 140. A power combiner 141 is provided to combine electrical RF signals transmitted from both the tracking RAU 94 and communications RAU 102 for downlink communications and to split uplink communication signals transmitted from client devices to the antenna 140 destined for the tracking RAU 94 and the communications RAU 102. Alternatively, the uplink communication signals may not be split between the tracking RAU 94 and the communications RAU 102. Both the tracking RAU 94 and communications RAU 102 may receive all uplink communication signals from client devices in range of the antenna 140 and communicate the signals back to the HEUs 120A, 120B. The HEUs 120A, 120B can employ filters or other processing techniques to separate the uplink communication signals from the uplink client device identification information, if needed or desired.

Figure 9:
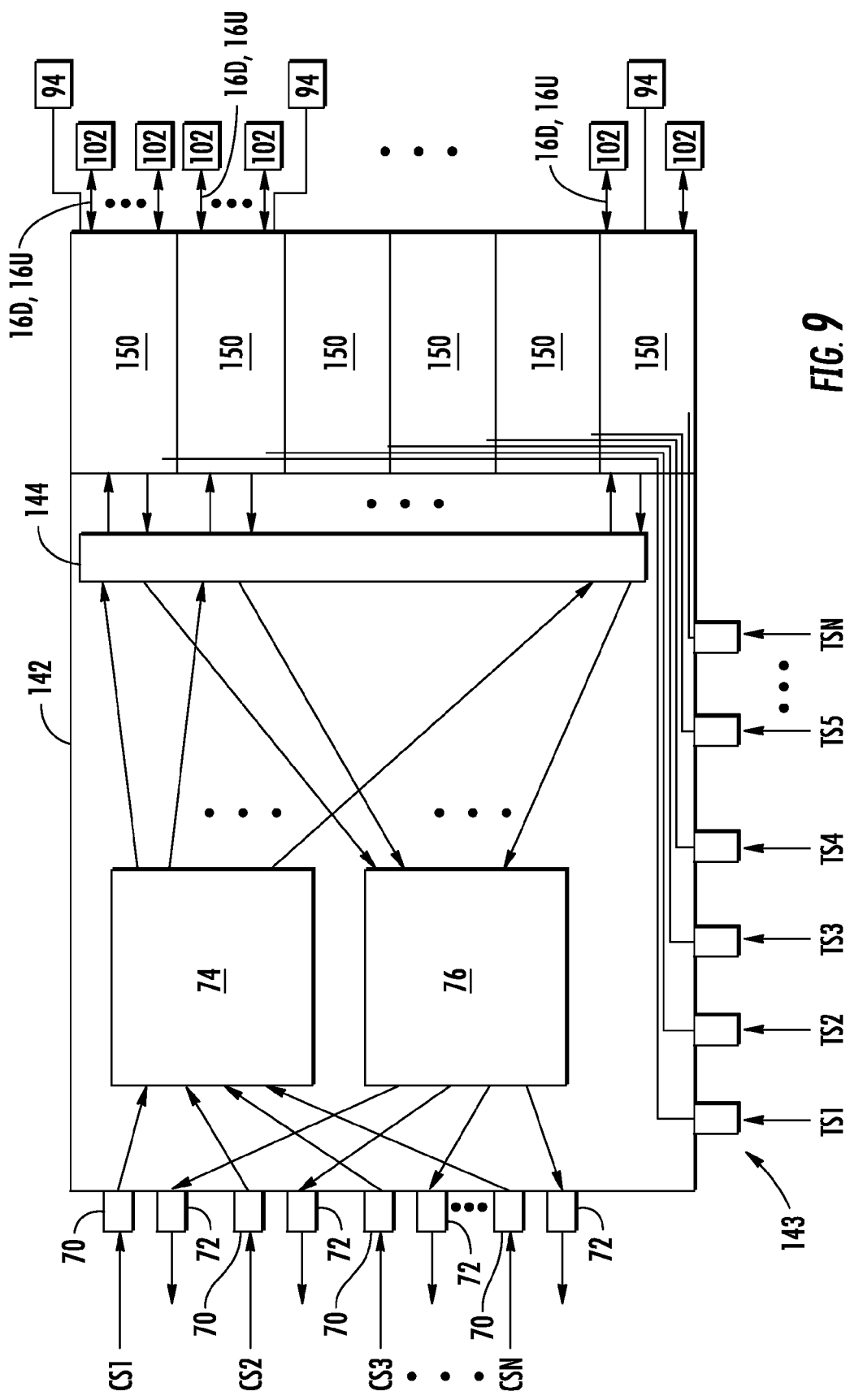
FIG. 9 is a schematic diagram of other exemplary alternative head-end equipment configured to provide communication signals to RAUs and tracking signals to tracking RAUs to support providing localization services for client devices.

FIG. 9 illustrates a schematic diagram of an exemplary embodiment of an HEU 142 with a port configuration to separate tracking signals inputs from communication signal inputs. In this regard, separate ports 143 are provided to receive tracking signals TS1-TSN from tracking signal generators to provide to tracking RAUs 94. The tracking signals TS1-TSN bypass the downlink BIC 74, the uplink BIC 76, and a connection panel 144 and are connected directly to ports in OICs 150. This can allow one HEU 142 to be provided to distribute both the tracking signals TS1-TSN and communication signals CS1-CSN instead of providing two separate HEUs, like provided in FIGS. 6 and 7. In this embodiment, the tracking signals TS1-TSN are combined with communication signals CS1-CSN in an OIC 80 that is configured to receive both signals. The combined tracking signals TS1-TSN and communication signals CS1-CSN are communicated to the tracking RAU 94 and the communications RAU 102. This implementation does not have the location resolution on a per RAU basis that would be provided if the tracking signals TS1-TSN were not combined in the OICs 150 with the communication signals CS1-CSN. The location resolution is per OIC 150 instead of per RAU 94, 102 in this embodiment. However, separate HEUs are not required in this embodiment. Further, the power signal levels between the tracking signals TS1-TSN and the communication signals CS1-CSN can be varied relative to each other.

Figure 10:
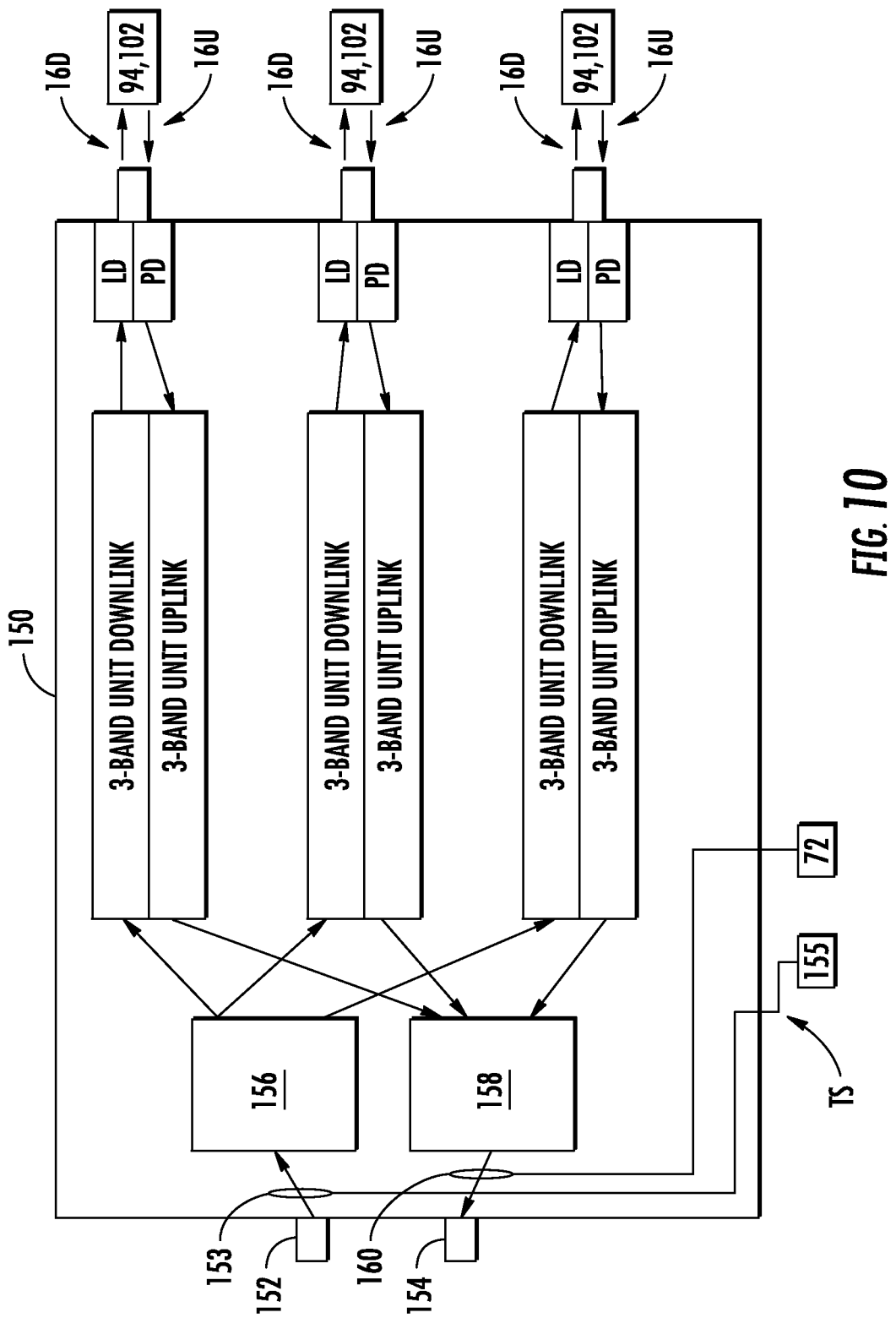
FIG. 10 is a schematic diagram of an exemplary optical interface card (OIC) adapted and configured to support providing localization services for client devices on a per-OIC resolution in an optical fiber-based distributed communications system.

FIG. 10 illustrates an example of an OIC 150 that may be provided as part of the OIC 80 in FIG. 9 to provide one solution to prevent the tracking signal received by the OIC 150 from being sent to all communications RAUs 102 supported by the OIC 150 so that tracking information is not lost. In this embodiment, an OIC 150 is provided and is comprised of a single PCB to support up to three (3) RAUs in this embodiment; however, this configuration is not required and the number of supported RAUs is not limiting. For example, two OICs 150 coupled be provide in a single optical interface module (OIM) to support up to six (6) RAUs in this embodiment. The OIC 150 is illustrated with one downlink port 152 and one uplink port 154. The downlink port 152 provides the combined downlink electrical RF signals from the downlink BIC 74 to the OIC 150 to convert such downlink electrical RF signals to downlink optical RF signals to communicate over the downlink optical fibers 16D to communications RAUs 102, as illustrated in FIG. 9. A splitter 156 splits the downlink RF signals into multiple copies to be provided to each of the communications RAUs 102 supported by the OIC 150. The uplink port 154 receives uplink electrical RF signals that are converted from uplink optical signals received from the communications RAUs 102. The uplink electrical RF signals are combined via a combiner 158 and passed to the uplink port 154 to be communicated to the uplink BIC 76.

In the OIC 150 of FIG. 10, the OIC 150 has been modified and adapted to be used to allow a tracking signal to be communicated to all communications RAUs 102 supported by the OIC 150 to provide a per-OIC location resolution. In this manner, a completely new design for the OIC 150 is not required. In this regard, a downlink tap 153 is provided in the OIC 150 to allow a tracking signal generator 155 to bypass the downlink BIC 74 to provide a tracking signal TS directly to the OIC 150. The tracking signal TS is communicated through the splitter 156 such that a copy of the tracking signal TS is provided to each RAU 94, 102 supported by the OIC 150. Thus, the location information provided by distribution of the tracking signal TS will only allow location determination on the resolution of the OIC 150 and not on a per RAU basis since the tracking signal is provided to all RAUs 94, 102 supported by the OIC 150. A downlink communication signal can also be communicated to the OIC 150 through the downlink port 152 to also provide communication signals to the RAUs 94, 102. The tracking signal TS and downlink communication signals will be split by the splitter 156 into copies provided to each RAU 94, 102.

Similarly, an uplink tap 160 is provided to bypass the uplink BIC 76 provided in an HEU so that client device identification information received from the RAUs 94, 102 is not combined with other uplink communication signals from other HEUs. The client device identification information received from the RAUs 94, 102 is combined by the combiner 158; thus, location information provided by distribution of the tracking signal TS in this embodiment will only allow location determination on the resolution of the OIC 150 and not on a per RAU basis.

Figure 11:
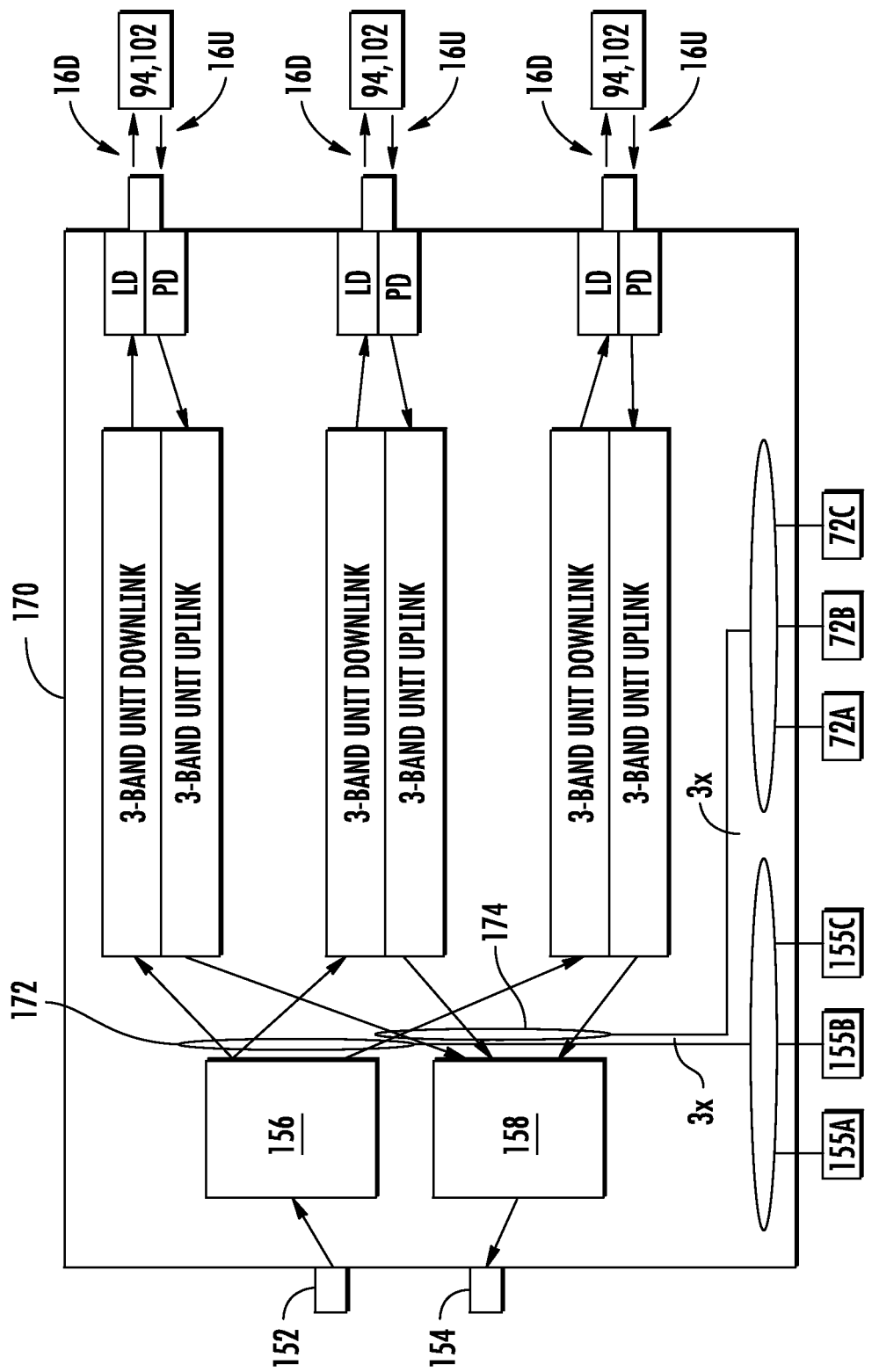
FIG. 11 is a schematic diagram of an exemplary OIC adapted and configured to support providing localization services for client devices on a per-RAU resolution in an optical fiber-based distributed communications system.

FIG. 11 illustrates an alternative OIC 170 that has also been modified and adapted to allow a tracking signal from a tracking signal generator and returned client device identification information from RAUs to bypass the downlink BIC 74 and the uplink BIC 76 like provided in the OIC 150 in FIG. 10. However, in the OIC 170 of FIG. 11, location determination can be provided on a per RAU basis instead of a per OIC basis. This is because downlink taps 172 for receiving tracking signals and uplink taps 174 for receipt of returned client device identification information are provided separately for each RAU 94, 102 supported by the OIC 170. In this embodiment, because the OIC 170 supports three (3) RAUs 94, 102, three (3) downlink taps 172 and three (3) uplink taps 174 are provided. The downlink taps 172 and uplink taps 174 are provided after the splitter 156 and combiner 158 so that the tracking signal is not copied to multiple RAUs 94, 102, and so that returned client device identification information from the RAUs 94, 102 is not combined. In this embodiment, the OIC 170 can receive up to three (3) tracking signal generators 155A-155C to provide unique tracking signals to each RAU 94, 102. Likewise, the client device identification information returned by the RAUs 94, 102 to the OIC 170 can be individually provided to three (3) separate outputs 72A-72C.

Further, as used herein, it is intended that terms "fiber optic cables" and/or "optical fibers" include all types of single mode and multi-mode light waveguides, including one or more optical fibers that may be upcoated, colored, buffered, ribbonized and/or have other organizing or protective structure in a cable such as one or more tubes, strength members, jackets or the like. Likewise, other types of suitable optical fibers include bend-insensitive optical fibers, or any other expedient of a medium for transmitting light signals. An example of a bend-insensitive, or bend resistant, optical fiber is ClearCurve® Multimode fiber commercially available from Corning Incorporated. Suitable fibers of this type are disclosed, for example, in U.S. Patent Application Publication Nos. 2008/0166094 and 2009/0169163.

Many modifications and other embodiments of the embodiments set forth herein will come to mind to one skilled in the art to which the embodiments pertain having the benefit of the teachings presented in the foregoing descriptions and the associated drawings. These modifications include, but are not limited to, whether a tracking signal is provided, whether downlink and/or uplink BICs are included, whether tracking signal inputs are provided in the same distributed communications apparatus as downlink inputs, the number and type of OICs and RAUs provided in the distributed communications system, etc.. Therefore, it is to be understood that the description and claims are not to be limited to the specific embodiments disclosed and that modifications and other embodiments are intended to be included within the scope of the appended claims. It is intended that the embodiments cover the modifications and variations of the embodiments provided they come within the scope of the appended claims and their equivalents. Although specific terms are employed herein, they are used in a generic and descriptive sense only and not for purposes of limitation.

What is claimed is:

1. A distributed communications apparatus, comprising:
at least one first downlink input configured to receive downlink electrical radio frequency (RF) communications signals;
at least one uplink output configured to receive and communicate uplink electrical RF communications signals from a communications uplink;
at least one optical interface (OI) configured to:
receive and convert the downlink electrical RF communications signals into downlink optical RF communications signals to be provided to at least one remote antenna unit (RAU); and
receive and convert uplink optical RF communications signals from the at least one RAU on the communications uplink into uplink electrical RF communications signals provided to the at least one uplink output; and
at least one second downlink input configured to receive at least one electrical tracking signal;
wherein the at least one OI is further configured to:
receive and convert the at least one electrical tracking signal into at least one optical tracking signal to be provided to the at least one RAU;
provide the at least one optical tracking signal to at least one tracking RAU; and
provide the downlink optical RF communications signals to at least one communications RAU; and
further comprising a common antenna coupled to both the at least one communications RAU and the at least one tracking RAU.

2. The distributed communications apparatus of claim 1, wherein the at least one electrical tracking signal is not split or combined.

3. The distributed communications apparatus of claim 1, wherein the at least one OI is configured to provide the at least one optical tracking signal to the at least one RAU.

4. The distributed communications apparatus of claim 1, wherein the at least one electrical tracking signal is comprised of a plurality of electrical tracking signals, wherein the at least one OI is configured to receive and convert each of the plurality of electrical tracking signals into a plurality of optical tracking signals and further configured to provide each of the plurality of optical tracking signals to an RAU among a plurality of RAUs.

5. The distributed communications apparatus of claim 4, wherein each of the plurality of electrical tracking signals provides a distinct location zone.

6. The distributed communications apparatus of claim 1, wherein the at least one OI is further configured to receive and convert the uplink optical RF communications signals containing client device identification information into the uplink electrical RF communications signals provided to the at least one uplink output.

7. The distributed communications apparatus of claim 1, wherein the at least one OI is configured to provide the downlink optical RF communication signals to at least one communications RAU.

8. The distributed communications apparatus of claim 7, wherein the at least one OI is further configured to provide the at least one optical tracking signal to the at least one communications RAU.

9. The distributed communications apparatus of claim 1, further comprising:
at least one downlink interface configured to receive the downlink electrical RF communications signals from the at least one first downlink input; and
at least one uplink interface configured to receive the uplink electrical RF communications signals from the communications uplink and provide the uplink electrical RF communications signals to the at least one uplink output.

10. The distributed communications apparatus of claim 9, wherein the at least one OI is configured to receive the at least one electrical tracking signal from at least one second downlink input distinct from the at least one first downlink input.

11. The distributed communications apparatus of claim 10, wherein the at least one OI is comprised of:
at least one communications OI configured to receive and convert the downlink electrical RF communications signals into downlink optical RF communications signals to be provided to the at least one communications RAU; and
at least one tracking OI configured to receive the at least one electrical tracking signal from the at least one tracking signal input and provide the at least one electrical tracking signal to the at least one tracking RAU.

12. The distributed communications apparatus of claim 11, further comprising:
first head-end equipment that includes the at least one downlink interface, the at least one uplink interface, and the least one communications OI; and
second head-end equipment that includes the at least one tracking signal input.

13. The distributed communications apparatus of claim 1, wherein the at least one OI further comprises at least one downlink tap on a splitter input to a splitter configured to receive the at least one electrical tracking signal from the at least one second downlink input.

14. The distributed communications apparatus of claim 1, wherein the at least one OI further comprises at least one uplink tap on a combiner output from a combiner configured to receive the uplink electrical RF communications signals.

15. The distributed communications apparatus of claim 1, wherein the at least one OI further comprises at least one downlink tap on a splitter output from a splitter configured to receive the at least one electrical tracking signal from the at least one second downlink input.

16. The distributed communications apparatus of claim 1, wherein the at least one OI further comprises at least one uplink tap on a combiner input to a combiner configured to receive the uplink electrical RF communications signals.

17. A distributed communications apparatus, comprising:
at least one first downlink input configured to receive downlink electrical radio frequency (RF) communications signals;
at least one uplink output configured to receive and communicate uplink electrical RF communications signals from a communications uplink;
at least one second downlink input configured to receive at least one electrical tracking signal;
at least one downlink interface configured to receive the downlink electrical RF communications signals from the at least one first downlink input;
at least one uplink interface configured to receive the uplink electrical RF communications signals from the communications uplink and provide the uplink electrical RF communications signals to the at least one uplink output;
at least one optical interface (OI), comprising:
at least one communications OI configured to receive and convert the downlink electrical RF communications signals into downlink optical RF communications signals to be provided to at least one communications remote antenna unit (RAU); and
at least one tracking OI configured to receive and convert the at least one electrical tracking signal from the at least one second downlink input into at least one optical tracking signal and provide the at least one optical tracking signal to at least one tracking RAU; and
wherein the at least one OI is configured to:
receive and convert the downlink electrical RF communications signals into the downlink optical RF communications signals to be provided to at least one communications RAU;
receive and convert uplink optical RF communications signals from the at least one communications RAU on the communications uplink into uplink electrical RF communications signals provided to the at least one uplink output;
receive and convert the at least one electrical tracking signal into at least one optical tracking signal to be provided to the at least one communications RAU; and
receive the at least one electrical tracking signal from the at least one second downlink input distinct from the at least one first downlink input.

18. The distributed communications apparatus of claim 17, further comprising:
a first head-end equipment that includes the at least one downlink interface, the at least one uplink interface, and the at least one communications OI; and
a second head-end equipment that includes at least one tracking signal input.

19. A distributed communications apparatus, comprising:
at least one first downlink input configured to receive downlink electrical radio frequency (RF) communications signals;
at least one uplink output configured to receive and communicate uplink electrical RF communications signals from a communications uplink;
at least one optical interface (OI) configured to:
receive and convert the downlink electrical RF communications signals into downlink optical RF communications signals to be provided to at least one remote antenna unit (RAU); and
receive and convert uplink optical RF communications signals from the at least one RAU on the communications uplink into the uplink electrical RF communications signals provided to the at least one uplink output; and
at least one second downlink input configured to receive at least one electrical tracking signal;
wherein the at least one OI is further configured to receive and convert the at least one electrical tracking signal into at least one optical tracking signal to be provided to the at least one RAU; and the at least one OI further comprises:
:   at least one downlink tap on a splitter input to a splitter configured to receive the at least one electrical tracking signal from the at least one second downlink input; and
    at least one uplink tap on a combiner output from a combiner configured to receive the uplink electrical RF communications signals.

20. A distributed communications apparatus, comprising:
at least one first downlink input configured to receive downlink electrical radio frequency (RF) communications signals;
at least one uplink output configured to receive and communicate uplink electrical RF communications signals from a communications uplink;
at least one optical interface (OI) configured to:
:   receive and convert the downlink electrical RF communications signals into downlink optical RF communications signals to be provided to at least one remote antenna unit (RAU); and
    receive and convert uplink optical RF communications signals from the at least one RAU on the communications uplink into the uplink electrical RF communications signals provided to the at least one uplink output; and at least one second downlink input configured to receive at least one electrical tracking signal;
wherein the at least one OI is further configured to receive and convert the at least one electrical tracking signal into at least one optical tracking signal to be provided to the at least one RAU; and
the at least one OI further comprises:
:   at least one downlink tap on a splitter output from a splitter configured to receive the at least one electrical tracking signal from the at least one second downlink input; and
    at least one uplink tap on a combiner input to a combiner configured to receive the uplink electrical RF communications signals.

\* \* \* \* \*